United States Patent
Landa et al.

(10) Patent No.: US 9,643,400 B2
(45) Date of Patent: May 9, 2017

(54) TREATMENT OF RELEASE LAYER

(71) Applicant: LANDA CORPORATION LTD., Rehovot (IL)

(72) Inventors: Benzion Landa, Nes Ziona (IL); Sagi Abramovich, Ra'anana (IL); Gregory Nakhmanovich, Rishon LeZion (IL); Dan Avital, Mazkeret Batya (IL); Galia Golodetz, Rehovot (IL); Yehoshua Sheinman, Ra'anana (IL)

(73) Assignee: LANDA CORPORATION LTD., Rehovot ( * ) Notice: Subject to any disclaimer, the term of this patent is extended or adjusted under 35 U.S.C. 154(b) by 0 days.

(21) Appl. No.: 14/382,930

(22) PCT Filed: Mar. 5, 2013

(86) PCT No.: PCT/IB2013/000757
§ 371 (c)(1),
(2) Date: Sep. 4, 2014

(87) PCT Pub. No.: WO2013/132339
PCT Pub. Date: Sep. 12, 2013

(65) Prior Publication Data
US 2015/0044431 A1    Feb. 12, 2015

Related U.S. Application Data

(60) Provisional application No. 61/611,557, filed on Mar. 15, 2012, provisional application No. 61/607,537, filed on Mar. 6, 2012, provisional application No. 61/606,913, filed on Mar. 5, 2012, provisional application No. 61/641,258, filed on May 1, 2012.

(51) Int. Cl.
| | |
|---|---|
| *B41J 2/005* | (2006.01) |
| *B41J 2/01* | (2006.01) |
| *C09D 11/10* | (2014.01) |
| *C09D 11/30* | (2014.01) |
| *B41M 5/025* | (2006.01) |
| *B41M 5/03* | (2006.01) |

(52) U.S. Cl.
CPC ............ *B41J 2/0057* (2013.01); *B41J 2/01* (2013.01); *B41M 5/0256* (2013.01); *B41M 5/03* (2013.01); *C09D 11/10* (2013.01); *C09D 11/30* (2013.01); *B41J 2002/012* (2013.01); *Y10T 428/24802* (2015.01); *Y10T 428/31663* (2015.04)

(58) Field of Classification Search
CPC ................... Y10T 428/24802; B41J 2/057
See application file for complete search history.

(56) References Cited

U.S. PATENT DOCUMENTS

| | | |
|---|---|---|
| 3,697,551 A | 10/1972 | Thomson et al. |
| 4,293,866 A | 10/1981 | Takita et al. |
| 4,401,500 A | 8/1983 | Hamada et al. |
| 4,853,737 A | 8/1989 | Hartley et al. |
| 5,039,339 A | 8/1991 | Phan et al. |
| 5,099,256 A | 3/1992 | Anderson |
| 5,106,417 A | 4/1992 | Hauser et al. |
| 5,190,582 A | 3/1993 | Shinozuka et al. |
| 5,352,507 A | 10/1994 | Bresson et al. |
| 5,608,004 A | 3/1997 | Toyoda et al. |
| 5,623,296 A | 4/1997 | Fujino et al. |
| 5,679,463 A | 10/1997 | Visser et al. |
| 5,723,242 A | 3/1998 | Lehman et al. |
| 5,733,698 A | 3/1998 | Lehman et al. |
| 5,736,250 A | 4/1998 | Heeks et al. |
| 5,772,746 A | 6/1998 | Sawada et al. |
| 5,859,076 A | 1/1999 | Kozma et al. |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,891,934 A | 4/1999 | Moffatt et al. |
| 5,895,711 A | 4/1999 | Yamaki |
| 5,902,841 A | 5/1999 | Jaeger et al. |
| 5,923,929 A | 7/1999 | Ben Avraham et al. |
| 5,929,129 A | 7/1999 | Feichtinger |
| 5,932,659 A | 8/1999 | Bambara et al. |

(Continued)

FOREIGN PATENT DOCUMENTS

| | | |
|---|---|---|
| CN | 1200085 A | 11/1998 |
| CN | 102925002 A | 2/2013 |
| EP | 1013466 A2 | 6/2000 |
| EP | 1158029 A1 | 11/2001 |
| EP | 2028238 A2 | 2/2009 |

(Continued)

OTHER PUBLICATIONS

English Translation of CN1200085 as published in WO9707991 dated Mar. 6, 1997.
Basf, "JONCRYL ? 537", Datasheet, Retrieved from the internet: Mar. 23, 2007 Mar. 23, 2007 (Mar. 23, 2007) p. 1.
Supplemental European Search Report for EP 13757427.3 dated Mar. 19, 2015.

(Continued)

*Primary Examiner* — Gerard Higgins
(74) *Attorney, Agent, or Firm* — Marc Van Dyke; Fourth Dimension IP

(57) ABSTRACT

There is provided a method for treating a hydrophobic release layer of an intermediate transfer member for use in a printing process in which a negatively charged aqueous inkjet ink including a polymeric resin and a colorant is jetted onto said layer, the claimed method comprising contacting the release layer, prior to jetting the ink, with an aqueous solution or dispersion of a positively charged polymeric chemical agent reducing the tendency of a jetted ink droplet to bead up on the intermediate transfer member. Other embodiments, such as hydrophobic release layers having such chemical agents disposed thereupon and printed ink images comprising the same, are also described.

20 Claims, 5 Drawing Sheets

(56) References Cited

U.S. PATENT DOCUMENTS

| | | |
|---|---|---|
| 5,935,751 A | 8/1999 | Matsuoka et al. |
| 6,004,647 A | 12/1999 | Bambara et al. |
| 6,024,786 A | 2/2000 | Gore |
| 6,053,438 A | 4/2000 | Romano, Jr. et al. |
| 6,059,407 A | 5/2000 | Komatsu et al. |
| 6,071,368 A | 6/2000 | Boyd et al. |
| 6,102,538 A | 8/2000 | Ochi et al. |
| 6,103,775 A | 8/2000 | Bambara et al. |
| 6,143,807 A | 11/2000 | Lin et al. |
| 6,166,105 A | 12/2000 | Santilli et al. |
| 6,196,674 B1 | 3/2001 | Takemoto |
| 6,214,894 B1 | 4/2001 | Bambara et al. |
| 6,221,928 B1 | 4/2001 | Kozma et al. |
| 6,242,503 B1 | 6/2001 | Kozma et al. |
| 6,257,716 B1 | 7/2001 | Yanagawa |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,332,943 B1 | 12/2001 | Herrmann et al. |
| 6,357,870 B1 | 3/2002 | Beach et al. |
| 6,358,660 B1 | 3/2002 | Agler et al. |
| 6,383,278 B1 | 5/2002 | Hirasa et al. |
| 6,397,034 B1 | 5/2002 | Tarnawskyj et al. |
| 6,432,501 B1 | 8/2002 | De Bastiani et al. |
| 6,530,321 B2 | 3/2003 | Andrew et al. |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,586,100 B1 | 7/2003 | Pickering et al. |
| 6,590,012 B2 | 7/2003 | Miyabayashi |
| 6,623,817 B1 | 9/2003 | De Bastiani et al. |
| 6,630,047 B2 | 10/2003 | Hine et al. |
| 6,682,189 B2 | 1/2004 | May et al. |
| 6,685,769 B1 | 2/2004 | Karl et al. |
| 6,709,096 B1 | 3/2004 | Beach et al. |
| 6,720,367 B2 | 4/2004 | Taniguchi et al. |
| 6,755,519 B2 | 6/2004 | Gelbart et al. |
| 6,770,331 B1 | 8/2004 | Mielke et al. |
| 6,789,887 B2 | 9/2004 | Yang et al. |
| 6,898,403 B2 | 5/2005 | Baker et al. |
| 6,916,862 B2 | 7/2005 | Ota et al. |
| 7,084,202 B2 | 8/2006 | Pickering et al. |
| 7,128,412 B2 | 10/2006 | King et al. |
| 7,160,377 B2 | 1/2007 | Zoch et al. |
| 7,271,213 B2 | 9/2007 | Hoshida et al. |
| 7,322,689 B2 | 1/2008 | Kohne et al. |
| 7,348,368 B2 | 3/2008 | Kataoka et al. |
| 7,612,125 B2 | 11/2009 | Mueller et al. |
| 7,655,707 B2 | 2/2010 | Ma |
| 7,655,708 B2 | 2/2010 | House et al. |
| 7,699,922 B2 | 4/2010 | Breton et al. |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,810,922 B2 | 10/2010 | Gervasi et al. |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,012,538 B2 | 9/2011 | Yokushi |
| 8,042,906 B2 | 10/2011 | Chiwata et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,263,683 B2 | 9/2012 | Gibson et al. |
| 8,304,043 B2 | 11/2012 | Nagashima et al. |
| 8,460,450 B2 | 6/2013 | Taverizatshy et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,894,198 B2 | 11/2014 | Hook et al. |
| 8,919,946 B2 | 12/2014 | Suzuki et al. |
| 2002/0102374 A1 | 8/2002 | Gervasi et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0018119 A1 | 1/2003 | Frenkel et al. |
| 2003/0032700 A1 | 2/2003 | Morrison et al. |
| 2003/0055129 A1 | 3/2003 | Alford |
| 2003/0118381 A1 | 6/2003 | Law et al. |
| 2003/0186147 A1 | 10/2003 | Pickering et al. |
| 2003/0232945 A1 | 12/2003 | Pickering et al. |
| 2003/0234849 A1 | 12/2003 | Pan et al. |
| 2004/0087707 A1 | 5/2004 | Zoch et al. |
| 2005/0110855 A1 | 5/2005 | Taniuchi et al. |
| 2005/0235870 A1 | 10/2005 | Ishihara |
| 2005/0266332 A1 | 12/2005 | Pavlisko et al. |
| 2006/0135709 A1 | 6/2006 | Hasegawa et al. |
| 2006/0164488 A1 | 7/2006 | Taniuchi et al. |
| 2007/0146462 A1 | 6/2007 | Taniuchi et al. |
| 2007/0176995 A1 | 8/2007 | Kadomatsu et al. |
| 2007/0285486 A1 | 12/2007 | Harris et al. |
| 2007/0292780 A1 | 12/2007 | Nagai et al. |
| 2008/0006176 A1 | 1/2008 | Houjou |
| 2008/0032072 A1 | 2/2008 | Taniuchi et al. |
| 2008/0044587 A1 | 2/2008 | Maeno et al. |
| 2008/0055381 A1 | 3/2008 | Doi et al. |
| 2008/0055385 A1 | 3/2008 | Houjou |
| 2008/0138546 A1 | 6/2008 | Soria et al. |
| 2008/0166495 A1 | 7/2008 | Maeno et al. |
| 2008/0196621 A1 | 8/2008 | Ikuno et al. |
| 2009/0041932 A1 | 2/2009 | Ishizuka et al. |
| 2009/0080949 A1 | 3/2009 | Yamanobe et al. |
| 2009/0082503 A1 | 3/2009 | Yanagi et al. |
| 2009/0087565 A1 | 4/2009 | Houjou |
| 2009/0165937 A1 | 7/2009 | Inoue |
| 2009/0211490 A1 | 8/2009 | Ikuno et al. |
| 2009/0244146 A1 | 10/2009 | Chiwata |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0075843 A1 | 3/2010 | Ikuno |
| 2010/0086692 A1 | 4/2010 | Ohta |
| 2010/0247818 A1 | 9/2010 | Wu |
| 2010/0282100 A1 | 11/2010 | Okuda et al. |
| 2010/0285221 A1 | 11/2010 | Oki et al. |
| 2011/0141188 A1 | 6/2011 | Morita |
| 2011/0195260 A1 | 8/2011 | Lee et al. |
| 2011/0234683 A1 | 9/2011 | Komatsu |
| 2011/0234689 A1 | 9/2011 | Saito |
| 2011/0269885 A1 | 11/2011 | Imai |
| 2011/0279554 A1 | 11/2011 | Dannhauser et al. |
| 2011/0304674 A1 | 12/2011 | Sambhy et al. |
| 2012/0013694 A1 | 1/2012 | Kanke |
| 2012/0026224 A1 | 2/2012 | Anthony et al. |
| 2012/0105525 A1 | 5/2012 | Leung et al. |
| 2012/0105561 A1 | 5/2012 | Taniuchi et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0156375 A1 | 6/2012 | Brust et al. |
| 2013/0127966 A1 | 5/2013 | Noguchi et al. |
| 2013/0338273 A1 | 12/2013 | Shimanaka et al. |
| 2014/0043398 A1 | 2/2014 | Butler et al. |
| 2015/0015650 A1 | 1/2015 | Landa et al. |
| 2015/0022602 A1 | 1/2015 | Landa et al. |
| 2015/0024180 A1 | 1/2015 | Landa et al. |
| 2015/0024648 A1 | 1/2015 | Landa et al. |
| 2015/0025179 A1 | 1/2015 | Landa et al. |
| 2015/0044431 A1 | 2/2015 | Landa et al. |

(56) References Cited

U.S. PATENT DOCUMENTS

| | | |
|---|---|---|
| 2015/0044437 A1 | 2/2015 | Landa et al. |
| 2015/0072090 A1 | 3/2015 | Landa et al. |
| 2015/0118503 A1 | 4/2015 | Landa et al. |

FOREIGN PATENT DOCUMENTS

| | | |
|---|---|---|
| JP | H08-62999 | 3/1996 |
| JP | 2000169772 A | 6/2000 |
| JP | 2000206801 A | 7/2000 |
| JP | 2002234243 A | 8/2002 |
| JP | 2002371208 A | 12/2002 |
| JP | 2003246135 A | 9/2003 |
| JP | 2004114377 A | 4/2004 |
| JP | 2004114675 A | 4/2004 |
| JP | 2004231711 A | 8/2004 |
| JP | 2004261975 A | 9/2004 |
| JP | 2005014255 A | 1/2005 |
| JP | 2005014256 A | 1/2005 |
| JP | 2006102975 A | 4/2006 |
| JP | 2006347081 A | 12/2006 |
| JP | 2008006816 A | 1/2008 |
| JP | 2008018716 A | 1/2008 |
| JP | 2008142962 A | 6/2008 |
| JP | 2008255135 A | 10/2008 |
| JP | 2009045794 A | 3/2009 |
| JP | 2009083317 A | 4/2009 |
| JP | 2009154330 A | 7/2009 |
| JP | 2009190375 A | 8/2009 |
| JP | 2009202355 A | 9/2009 |
| JP | 2009214318 A | 9/2009 |
| JP | 2009226852 A | 10/2009 |
| JP | 2009233977 A | 10/2009 |
| JP | 2009234219 A | 10/2009 |
| JP | 2010105365 A | 5/2010 |
| JP | 2010173201 A | 8/2010 |
| JP | 2010241073 A | 10/2010 |
| JP | 2011025431 A | 2/2011 |
| JP | 2011173325 A | 9/2011 |
| JP | 2011201951 A | 10/2011 |
| JP | 2012086499 A | 5/2012 |
| WO | 860327 A2 | 1/1986 |

OTHER PUBLICATIONS

Thomas E. Furia "CRC Handbook of Food Additives, Second Edition, vol. 1" CRC Press LLC, p. 231 (1972).
CN 102925002 Machine Translation (by EPO and Google)—published Feb. 13, 2013; Jiangnan University.
JP 2000-169772 Machine Translation (by EPO and Google)—published Jun. 20, 2000; Tokyo Ink MEG Co Ltd.
JP 2002-234243 Machine Translation (by EPO and Google)—published Aug. 20, 2002; Hitachi Koki Co Ltd.
JP 2002-371208 Machine Translation (by EPO and Google)—published Dec. 26, 2002; Canon Inc.
JP 2004-114377 Machine Translation (by EPO and Google)—published Apr. 15, 2004; Konica Minolta Holdings Inc, et al.
JP 2004-114675 Machine Translation (by EPO and Google)—published Apr. 15, 2004; Canon Inc.
JP 2004-231711 Machine Translation (by EPO and Google)—published Aug. 19, 2004; Seiko Epson Corp.
JP 2005-014255 Machine Translation (by EPO and Google)—published Jan. 20, 2005; Canon Inc.
JP 2005-014256 Machine Translation (by EPO and Google)—published Jan. 20, 2005; Canon Inc.
JP 2006-102975 Machine Translation (by EPO and Google)—published Apr. 20, 2006; Fuji Photo Film Co Ltd.
JP 2006-347081 Machine Translation (by EPO and Google)—published Dec. 28, 2006; Fuji Xerox Co Ltd.
JP 2008-006816 Machine Translation (by EPO and Google)—published Jan. 17, 2008; Fujifilm Corp.
JP 2008-018716 Machine Translation (by EPO and Google)—published Jan. 31, 2008; Canon Inc.
JP 2008-142962 Machine Translation (by EPO and Google)—published Jun. 26, 2008; Fuji Xerox Co Ltd.
JP 2008-255135 Machine Translation (by EPO and Google)—published Oct. 23, 2008; Fujifilm Corp.
JP 2009-045794 Machine Translation (by EPO and Google)—published Mar. 5, 2009; Fujifilm Corp.
JP 2009-083317 Abstract; Machine Translation (by EPO and Google)—published Apr. 23, 2009; Fujifilm Corp.
JP 2009-154330 Machine Translation (by EPO and Google)—published Jul. 16, 2009; Seiko Epson Corp.
JP 2009-190375 Machine Translation (by EPO and Google)—published Aug. 27, 2009; Fuji Xerox Co Ltd.
JP 2009-202355 Machine Translation (by EPO and Google)—published Sep. 10, 2009; Fuji Xerox Co Ltd.
JP 2009-214318 Machine Translation (by EPO and Google)—published Sep. 24, 2009 Fuji Xerox Co Ltd.
JP 2009-226852 Machine Translation (by EPO and Google)—published Oct. 8, 2009; Fujifilm Corp.
JP 2009-233977 Machine Translation (by EPO and Google)—published Oct. 15, 2009; Fuji Xerox Co Ltd.
JP 2009-234219 Machine Translation (by EPO and Google)—published Oct. 15, 2009; Fujifilm Corp.
JP 2010-105365 Machine Translation (by EPO and Google)—published May 13, 2010; Fuji Xerox Co Ltd.
JP 2010-173201 Abstract; Machine Translation (by EPO and Google)—published Aug. 12, 2010; Richo Co Ltd.
JP 2010-241073 Machine Translation (by EPO and Google)—published Oct. 28, 2010; Canon Inc.
JP 2011-025431 Machine Translation (by EPO and Google)—published Feb. 10, 2011; Fuji Xerox Co Ltd.
JP 2011-173325 Abstract; Machine Translation (by EPO and Google)—published Sep. 8, 2011; Canon Inc.
JP 2012-086499 Machine Translation (by EPO and Google)—published May 10, 2012; Canon Inc.
International Search Report for PCT/IB2013/051755 published as WO2013132439.
Written Opinion for PCT/IB2013/051755 published as WO2013132439.
IPRP for PCT/IB2013/051755 published as WO2013132439.
International Search Report for PCT/IB2013/000782 published as WO2013132340.
Written Opinion for PCT/IB2013/000782 published as WO2013132340.
IPRP for PCT/IB2013/000782 published as WO2013132340.
Office Action for U.S. Appl. No. 14/382,881 dated Dec. 16, 2014.
European Search Report for EP 13757427.3 dated Mar. 19, 2015.
JP 2000206801 Machine Translation (by PlatPat English machine translation)—published Jul. 28, 2000 Kobayashi et al.
JP 2003246135 Machine Translation (by PlatPat English machine translation)—published Sep. 2, 2003 Morohoshi et al.
JP 2004261975 Machine Translation (by PlatPat English machine translation)—published Sep. 24, 2004 Kataoka et al.
JP 2011201951 Machine Translation (by PlatPat English machine translation)—published Oct. 13, 2011 Todoroki et al.
JP H08-62999 Machine Translation (by EPO & Google)—published Mar. 8, 1996 Yoshida, Tomoyuki.

FIG. 5A: "Negative Control" untreated blanket at 150°C
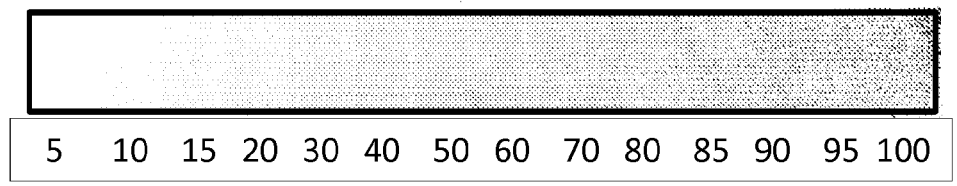
FIG. 5B: Blanket treated with
0.3% PEI (wt/wt); pH 9.5, at 150°C
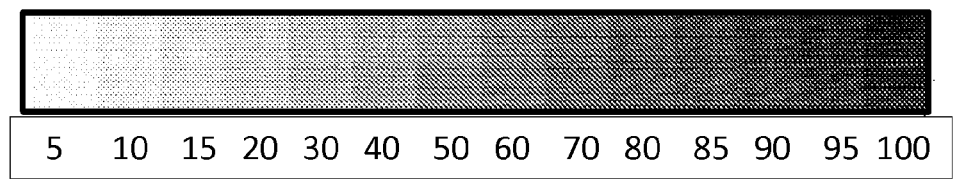
FIG. 5C: Blanket treated with
0.5% Guar 3196 (wt/wt); pH 9.5, at 150°C
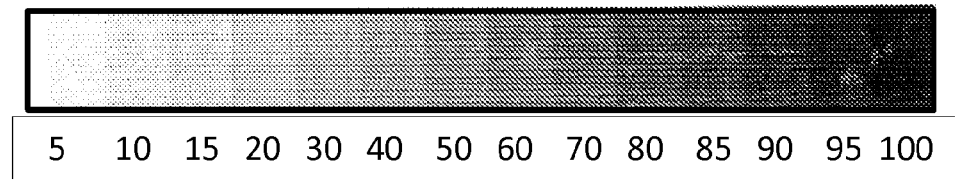
FIG. 5D: Blanket treated with
0.5% Viviprint 200 (wt/wt); pH 5.3, at 150°C
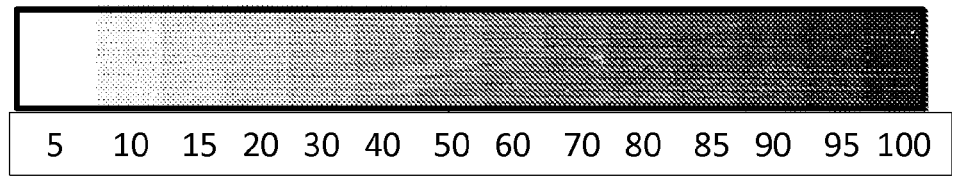

TREATMENT OF RELEASE LAYER

This application claims Paris Convention priority from, and the benefit under U.S. law of, provisional applications Nos. U.S. 61/606,913 filed 5 Mar. 2012; U.S. 61/611,557 filed 15 Mar. 2012; U.S. 61/607,537 file 6 Mar. 2012; and U.S. 61/641,258 filed 1 May 2012. The contents of these applications are incorporated herein by reference.

FIELD AND BACKGROUND

The present invention relates to indirect printing systems and more particularly to compositions suitable for the treatment of intermediate transfer members.

Digital printing techniques have been developed that allow a printer to receive instructions directly from a computer without the need to prepare printing plates. Amongst these are color laser printers that use the xerographic process. Color laser printers using dry toners are suitable for certain applications, but they do not produce images of a photographic quality acceptable for publications, such as magazines.

A process that is better suited for short run high quality digital printing is used in the HP-Indigo printer. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto paper or any other substrate.

Inkjet and bubble jet processes are commonly used in home and office printers. In these processes droplets of ink are sprayed onto a final substrate in an image pattern. In general, the resolution of such processes is limited due to wicking by the inks into paper substrates. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications, especially for commercial printing. Furthermore, the use of coated substrates creates its own problems in that the surface of the substrate remains wet and additional costly and time consuming steps are needed to dry the ink, so that it is not later smeared as the substrate is being handled, for example stacked or wound into a roll. Furthermore, excessive wetting of the substrate by the ink causes cockling and makes printing on both sides of the substrate (also termed perfecting or duplex printing) difficult, if not impossible.

Furthermore, inkjet printing directly onto porous paper, or other fibrous material, results in poor image quality because of variation of the distance between the print head and the surface of the substrate.

Using an indirect or offset printing technique overcomes many problems associated with inkjet printing directly onto the substrate. It allows the distance between the surface of the intermediate image transfer member and the inkjet print head to be maintained constant and reduces wetting of the substrate, as the ink can be dried on the intermediate image member before being applied to the substrate. Consequently, the final image quality on the substrate is less affected by the physical properties of the substrate.

The use of transfer members which receive ink droplets from an ink or bubble jet apparatus to form an ink image and transfer the image to a final substrate have been reported in the patent literature. Various ones of these systems utilize inks having aqueous carriers, non-aqueous carrier liquids or inks that have no carrier liquid at all (solid inks).

The use of aqueous based inks has a number of distinct advantages. Compared to non-aqueous based liquid inks, the carrier liquid is not toxic and there is no problem in dealing with the liquid that is evaporated as the image dries. As compared with solid inks, the amount of material that remains on the printed image can be controlled, allowing for thinner printed images and more vivid colors.

Generally, a substantial proportion or even all of the liquid is evaporated from the image on the intermediate transfer member, before the image is transferred to the final substrate in order to avoid bleeding of the image into the structure of the final substrate. Various methods are described in the literature for removing the liquid, including heating the image and a combination of coagulation of the image particles on the transfer member, followed by removal of the liquid by heating, air knife or other means.

Generally, silicone coated transfer members are preferred, since this facilitates transfer of the dried image to the final substrate. However, silicone is hydrophobic which causes the ink droplets to bead on the transfer member. This makes it more difficult to remove the water in the ink and also results in a small contact area between the droplet and the blanket that renders the ink image unstable during rapid movement of the transfer member.

Surfactants and salts have been used to reduce the surface tension of the droplets of ink so that they do not bead as much. While these do help to alleviate the problem partially, they do not solve it. Hence, compositions suitable for the treatment of the intermediate transfer member of an indirect printing system are desired.

BRIEF DESCRIPTION

The presently claimed invention pertains to a particular aspect of a novel printing process and system for indirect digital inkjet printing using aqueous inks, other aspects of which are described and claimed in other applications of the same Applicant which have been filed or will be filed at approximately the same time as the present application. Further details on examples of such printing systems are provided in co-pending PCT application Nos. PCT/IB2013/051716 (Agent's reference LIP 5/001 PCT), PCT/IB2013/051717 (Agent's reference LIP 5/003 PCT) and PCT/IB2013/051718 (Agent's reference LIP 5/006 PCT). A non-limitative description of such printing systems will be provided below.

Briefly, the printing process shared in particular, but not exclusively, by the above-mentioned systems, comprises directing droplets of an aqueous inkjet ink onto an intermediate transfer member having a hydrophobic release layer to form an ink image on the release layer, the ink including an organic polymeric resin and a coloring agent in an aqueous carrier, and the transfer member having a hydrophobic outer surface. Upon impinging upon the intermediate transfer member, each ink droplet in the ink image spreads to form an ink film. The ink is then dried while the ink image is being transported by the intermediate transfer member, by evaporating the aqueous carrier from the ink image to leave a residue film of resin and coloring agent. The residue film is then transferred to a substrate. Without wishing to be bound by theory, it is presently believed that mutually attractive intermolecular forces between molecules in the outer region of each ink droplet nearest the surface of the intermediate transfer member and molecules on the surface of the intermediate transfer member itself (e.g. between negatively charged molecules in the ink and positively charged molecules on the surface of the intermediate transfer member) counteract the tendency of the ink film produced by each droplet to bead under the action of the surface tension of the aqueous carrier, without causing each droplet to spread by wetting the surface of the intermediate transfer member. The presently claimed invention pertains to a method of treating the surface of the intermediate transfer member to enable its sufficient interaction with the molecules of the ink, including chemical agents suitable for use in such a method, as well as printed articles obtainable by the use of said method and agents.

In accordance with an embodiment of the present invention, in a printing process such as that just described or as will described in more detail hereinbelow, in which an aqueous inkjet ink containing a negatively charged polymeric resin is jetted onto a hydrophobic release layer prior to being transferred to a substrate, there is provided a method for treating the release layer prior to the jetting of the aqueous ink onto the release layer, the method comprising contacting the release layer with an aqueous solution or dispersion of a polymeric chemical agent having at least one of (1) a positive charge density of at least 3 meq/g of chemical agent and an average molecular weight of at least 250, and (2) a nitrogen content of at least 1% and a molecular weight of at least 10,000. In some embodiments, the chemical agent, which may alternatively be referred to as a conditioning or pre-treatment agent, has a positive charge density of at least 3 meq/g and the average molecular weight is at least 5,000. In some embodiments, the chemical agent has a positive charge density of at least 6 meq/g and the average molecular weight is at least 1,000. In some embodiments, the chemical agent has a nitrogen content of at least 1 wt. % and an average molecular weight of at least 50,000. In some embodiments, the chemical agent has a nitrogen content of at least 18 wt. % and an average molecular weight of at least 10,000.

In some embodiments, the positive charge density is at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of chemical agent.

In some embodiments, the chemical agent has an average molecular weight of at least 500, at least 800, at least 1,000, at least 1,300, at least 1,700, at least 2,000, at least 2,500, at least 3,000, at least 3,500, at least 4,000, at least 4,500, at least 5,000, at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments, the chemical agent comprises one or more positively chargeable nitrogen atoms. (By a "positively chargeable polymer" or "positively chargeable group" is meant a polymer or chemical moiety which either can readily add a proton (e.g. —$NH_2$) or has a permanent positive charge (e.g. —$N(CH_3)_3^+$); as used herein, the term refers to an inherent property of the polymer or moiety, and thus may encompass polymers or moieties which are in an environment in which such protons are added, as well as polymers in an environment in which such protons are not added. In contrast, the term "a positively charged" polymer or group refers to a polymer or group in an environment in which one or more such protons have been added or which has a permanent positive charge.) In some embodiments, the one or more chargeable nitrogen atoms of the chemical agent are selected from the group of primary, secondary and tertiary amines and quaternary ammonium groups and combinations of such groups. In some embodiments, such groups are covalently bound to a polymeric backbone and/or constitute part of such a backbone. In some embodiments the one or more nitrogen atoms are part of a cyclic moiety. In some embodiments, the one or more nitrogen atoms constitute at least 1%, at least 1.4%, at least 2%, at least 5%, at least 8%, at least 10%, at least 15%, at least 18%, at least 20%, at least 24%, at least 30%, at least 35%, at least 40%, at least 45%, or at least 50% by weight of the chemical agent.

In some embodiments, the chemical agent is a solid at room temperature.

In some embodiments, the chemical agent is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacrylamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride. In some embodiments, the chemical agent is a polyethylene imine.

In some embodiments, the chemical agent is stable at temperatures of up to at least 100° C., at least 125° C., or at least 150° C. In this context, "stable" means that decomposition is not observed using thermogravimetric analysis (TGA).

In some embodiments, the concentration of the chemical agent in the solution or dispersion prior to application is not more than 5 wt. %, not more than 4 wt. %, not more than 3 wt. %, not more than 2 wt. %, not more than 1 wt. %, not more than 0.5 wt. %, not more than 0.4 wt. %, not more than 0.3 wt. %, not more than 0.2 wt. %, not more than 0.1 wt. %, not more than 0.05 wt. %, or not more than 0.01 wt. %.

In some embodiments, the chemical agent is applied to the release layer using a roller. In some embodiments, the chemical agent is applied by spraying. In some embodiments, the chemical agent is applied to the release layer by spraying and then evened using a metering roller. In some embodiments, the metering roller is chrome-plated. In some embodiments, the chemical agent is applied to the release layer so that the thickness of the solution or dispersion of chemical agent on the release layer prior to removal of the solvent is less than 1,000 microns, less than 900 microns, less than 800 microns, less than 700 microns, less than 600 microns, less than 500 microns, less than 400 microns, less than 300 microns, less than 200 microns, less than 100 microns, less than 50 microns, less than 10 microns, or less than 1 micron.

In some embodiments, the method further comprises removing (e.g. evaporating) the solvent in which the chemical agent is dissolved or dispersed. In some embodiments, the average thickness of the chemical agent on the release layer after evaporation of the solvent is not more than 1,000 nm, not more than 900 nm, not more than 800 nm, not more than 700 nm, not more than 600 nm, not more than 500 nm, not more than 400 nm, not more than 300 nm, not more than 200 nm, not more than 100 nm, not more than 90 nm, not more than 80 nm, not more than 70 nm, not more than 60 nm, not more than 50 nm, not more than 40 nm, not more than 30 nm, not more than 20 nm, not more than 15 nm, not more than 10 nm, not more than 9 nm, not more than 8 nm, not more than 7 nm, not more than 6 nm, not more than 5 nm, not more than 4 nm, not more than 3 nm, not more than 2 nm, or not more than 1 nm.

In some embodiments, the concentration of the chemical agent on the release layer after evaporation of the solvent is not more than 50 mg per square meter, not more than 40 mg/m$^2$, not more than 30 mg/m$^2$, not more than 20 mg/m$^2$, not more than 10 mg/m$^2$, not more than 5 mg/m$^2$, not more than 4 mg/m$^2$, not more than 3 mg/m$^2$, not more than 2 mg/m$^2$, not more than 1 mg/m$^2$, not more than 0.5 mg/m$^2$, not more than 0.1 mg/m$^2$, not more than 0.05 mg/m$^2$ or not more than 0.01 mg/m$^2$.

In some embodiments, the hydrophobic outer release layer comprises a silane, silyl or silanol-modified or -terminated polydialkylsiloxane silicone polymer, or hybrids of such polymers. In some embodiments, these silicone polymers are cross-linked by condensation curing of the silane groups. Thus, in some embodiments, the release layer comprises a cross-linked silanol- or silyl-terminated polydialkylsiloxane. In some embodiments, the hydrophobic outer release layer comprises silanol-terminated polydialkylsiloxane cross-linked with a polyethylsilicate oligomer.

In some embodiments, the temperature of the release layer when contacted with the aqueous solution or dispersion of the chemical agent is at least 60° C., at least 80° C., at least 100° C., at least 110° C., at least 120° C., at least 130° C., at least 140° C. or at least 150° C.

In some embodiments, the change in the contact angle of a drop of distilled water on the release layer to which the chemical agent has been applied and the solvent removed therefrom is not more than 10 degrees, not more than 9 degrees, not more than 8 degrees, not more than 7 degrees, not more than 6 degrees, not more than 5 degrees, not more than 4 degrees, not more than 3 degrees, not more than 2 degrees, not more than 1 degree relative to a drop of distilled water on the release layer to which the chemical agent has not been applied. In some embodiments, the change is at least 0.1 degrees, at least 0.2 degrees, at least 0.3 degrees, at least 0.4 degrees, at least 0.5 degrees, at least 0.6 degrees, at least 0.7 degrees, at least 0.8 degrees, at least 0.9 degrees or at least 1 degree relative to a drop of distilled water on the release layer to which the chemical agent has not been applied.

In some embodiments, the reduction in the contact angle of a drop of distilled water on the release layer to which the chemical agent has been applied and the solvent removed therefrom is not more than 20%, not more than 15%, not more than 10%, not more than 9%, more than 8%, not more than 7%, not more than 6%, not more than 5%, not more than 4%, not more than 3%, not more than 2%, or not more than 1% relative to the contact angle of a drop of distilled water on the release layer to which the chemical agent has not been applied. In some embodiments, the reduction in the contact angle is at least 0.1%, at least 0.2%, at least 0.3%, at least 0.4%, at least 0.5%, at least 0.6%, at least 0.7%, at least 0.8%, at least 0.9%, or at least 1% relative to the contact angle of a drop of distilled water on the release layer to which the chemical agent has not been applied. In some embodiments, the contact angle on the release layer to which the chemical agent has been applied and the solvent removed therefrom is at least 90 degrees.

In some embodiments, the method further comprises printing an ink drop to form an ink film on the chemical agent on the release layer, wherein the ratio of charges in the ink film to the charges in the chemical agent in the region covered by said ink film is at least 1:1, at least 2:1, at least 3:1, at least 4:1, at least 5:1, at least 10:1, at least 20:1, at least 30:1, at least 40:1, at least 50:1, at least 60:1, at least 70:1 or at least 80:1.

In some embodiments, the method further comprises printing an aqueous inkjet ink image on the release layer having the chemical agent thereupon; the aqueous inkjet ink comprising an aqueous solvent, a colorant, preferably a pigment, and a negatively chargeable polymeric resin; removing the solvent from the printed aqueous inkjet ink; and transferring the image to a substrate.

In some embodiments, when the substrate is Condat Gloss® 135 gsm coated paper, the optical density of the printed image on the substrate is at least 50% greater than the optical density of the same image when printed under identical conditions but without application of the chemical agent to the release layer. In some embodiments, the optical density is at least 60% greater. In some embodiments, the optical density is at least 70% greater. In some embodiments, the optical density is at least 80% greater. In some embodiments, the optical density is at least 90% greater. In some embodiments, the optical density is at least 100% greater, or at least 150% greater, or at least 200% greater or at least 250% greater, or at least 300% greater, or at least 350% greater, or at least 400% greater, or at least 450% greater, or at least 500% greater.

There is also provided, in accordance with an embodiment of the invention, a hydrophobic release layer of an intermediate transfer member of a printing system, the hydrophobic release layer having disposed thereupon a polymeric chemical agent having (1) a nitrogen content of at least 1 wt. % and at least one of (a) a positive charge density of at least 3 meq/g of chemical agent and an average molecular weight of at least 5,000 (b) a positive charge density of 6 meq/g of chemical agent and an average molecular weight of at least 1,000, and (c) an average molecular weight of at least 50,000, and/or (2) a nitrogen content of at least 18 wt. % and an average molecular weight of at least 10,000.

In some embodiments, the polymer disposed on the release layer contains one or more chargeable nitrogen atoms.

In some embodiments, the thickness of the chemical agent disposed on the release layer is not more than 1,000 nm, not more than 900 nm, not more than 800 nm, not more than 700 nm, not more than 600 nm, not more than 500 nm, not more than 400 nm, not more than 300 nm, not more than 200 nm, not more than 100 nm, not more than 90 nm, not more than 80 nm, not more than 70 nm, not more than 60 nm, not more than 50 nm, not more than 40 nm, not more than 30 nm, not more than 20 nm, not more than 10 nm, not more than 9 nm, not more than 8 nm, not more than 7 nm, not more than 6 nm, not more than 5 nm, not more than 4 nm, not more than 3 nm, not more than 2 nm, or not more than 1 nm.

In some embodiments, the chemical agent disposed upon the release layer has an average molecular weight of at least 800, at least 1,000, at least 1,300, at least 1,700, at least 2,000, at least 2,500, at least 3,000, at least 3,500, at least 4,000, at least 4,500, at least 5,000, of at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments, the positive charge density of the chemical agent disposed upon the release layer is at least 0.5 meq/g, at least 1 meq/g, at least 2 meq/g, at least 3 meq/g, at least 4 meq/g, at least 5 meq/g, at least 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of chemical agent.

In some embodiments, the chemical agent disposed upon the release layer is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacrylamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride. In some embodiments, the chemical agent is polyethylene imine.

In some embodiments, the concentration of the chemical agent disposed on the release layer is not more than 50 mg per square meter, not more than 40 mg/m$^2$, not more than 30 mg/m$^2$, not more than 20 mg/m$^2$, not more than 10 mg/m$^2$, not more than 5 mg/m$^2$, not more than 4 mg/m$^2$, not more than 3 mg/m$^2$, not more than 2 mg/m$^2$, not more than 1 mg/m$^2$, or not more than 0.5 mg/m$^2$.

There is also provided, in accordance with an embodiment of the invention, a printed ink image on a substrate, the printed ink image comprising a water-soluble or water-dispersible polymeric resin, wherein at least one of the following is true: (a) the image has an X-Ray Photoelectron Spectroscopy (XPS) peak at 402.0±0.4 eV, 402.0±0.3 eV, or 402.0±0.2 eV; (b) the image has been printed by a printing method in accordance with an embodiment of the invention in which a chemical agent as described herein is applied to a hydrophobic release layer of an intermediate transfer member; (c) the image has on its outer surface distal to the substrate a polymeric chemical agent containing at least 1 wt. % of one or more chargeable nitrogen atoms and having at least one of (1) a positive charge density of at least 3 meq/g of chemical agent and an average molecular weight of at least 250 and (2) a molecular weight of at least 10,000; (e) the ratio of the surface concentration of nitrogen at the outer surface of the image distal to the substrate to the bulk concentration of nitrogen within the image is at least 1.2:1, at least 1.3:1, at least 1.5:1, at least 1.75:1, at least 2:1, at least 3:1, or at least 5:1.ratio being at least 1.2:1, at least 1.3:1, at least 1.5:1, at least 1.75:1, at least 2:1, at least 3:1, or at least 5:1; (f) the atomic surface concentration ratio of nitrogen to carbon (N/C) at the image surface distal to the substrate to the atomic bulk concentration ratio of nitrogen to carbon (N/C) at the depth, is at least 1.1:1, at least 1.2:1, at least 1.3:1, at least 1.5:1, at least 1.75:1, or at least 2:1; (g) the surface concentration of secondary amines, tertiary amines, and/or an ammonium group at the image surface distal to the substrate exceeds their respective bulk concentrations at a depth of at least 30 nanometers below the surface. In some embodiments, the chemical agent on the printed ink image contains one or more chargeable nitrogen atoms.

In some embodiments, the chemical agent on the printed ink image has an average molecular weight of at least 800, at least 1,000, at least 1,300, at least 1,700, at least 2,000, at least 2,500, at least 3,000, at least 3,500, at least 4,000, at least 4,500, at least 5,000, of at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments, the positive charge density of the chemical agent on the printed image is at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of chemical agent.

In some embodiments the polymer on the printed image is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacrylamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride. In some embodiments the polymer in the printed image is polyethylene imine.

In some embodiments, a surface concentration of nitrogen at the surface distal to the substrate on which the printed ink image rests exceeds a bulk concentration of nitrogen within the bulk of the ink image, the bulk concentration being measured at a depth of at least 30 nanometers, at least 50 nanometers, at least 100 nanometers, at least 200 nanometers, or at least 300 nanometers below the ink image surface distal to the substrate, and the ratio of the surface concentration to the bulk concentration is at least 1.1 to 1. In some embodiments, the bulk concentration is measured at a depth of at least 30 nm from the ink image surface distal to the substrate.

DETAILED DESCRIPTION

As mentioned above, the presently claimed invention pertains to a particular aspect of a novel printing process and apparatus for indirect digital inkjet printing using aqueous inks. Briefly, the printing process comprises directing droplets of an aqueous inkjet ink onto an intermediate transfer member having a hydrophobic release layer to form an ink image on the release layer, the ink including a negatively charged polymeric resin and a colorant in an aqueous carrier. The term "release layer" is used herein to denote the hydrophobic outer surface of the intermediate transfer member, and while in some instances that outer surface may be part of a layer that is readily distinguishable from the rest of the intermediate transfer member, in theory it is possible that the intermediate transfer member has a uniform construction, in which case the outer surface will not, strictly speaking, be part of a separate layer. Upon impinging upon the intermediate transfer member, each ink droplet in the ink image spreads to form an ink film having a pancake-like structure. The ink is then dried while the ink image is on the intermediate transfer member, generally while being transported by the intermediate transfer member, by evaporating the aqueous carrier from the ink image to leave a residue film of resin and coloring agent. The residue film is then transferred to a substrate.

Upon impinging upon the surface of the intermediate transfer member, each ink droplet tends to spread out into a pancake-like structure due to the kinetic energy of the droplet itself. However, because the ink used in the process described above is aqueous, but the release layer of the intermediate transfer member is hydrophobic, the ink droplets tend to bead on the transfer member. The term "to bead" is used herein to describe the action of surface tension to cause a pancake or disk-like film to contract radially and increase in thickness so as to form a bead, that is to say a near-spherical globule. Thus the chemical compositions of the ink and of the chemical agent which applied to the surface of the intermediate transfer member are selected so as to counteract the tendency of the ink film produced by each droplet to bead under the action of the surface tension of the aqueous carrier, without causing each droplet to spread by wetting the surface of the intermediate transfer member. Without wishing to be bound by theory, it is presently believed that, in the case of the presently claimed invention, this is due to mutually attractive intermolecular forces between molecules in the region of each droplet nearest the surface of the intermediate transfer member and molecules on the surface of the intermediate transfer member itself.

In the context of this patent application, "chargeable nitrogen atom" refers to both a nitrogen atom which may be positively charged at acidic pH, such as a primary, secondary or tertiary amine nitrogen atom, which as is known in the art function as Bronsted bases to abstract a proton from a Bronsted acid to form the corresponding ammonium cation, as well as to a quaternary ammonium ion, which bears a permanent positive charge. In the context of this patent application, when referring to the chemical agent, "positive charge density of X" means the chemical agent has X milliequivalents of charge per gram of chemical agent at pH 4.5.

A hydrophobic outer surface on the intermediate transfer member is desirable as it assists in the eventual transfer of the residue film to the substrate. Such a hydrophobic outer surface or release layer is however undesirable during ink image formation, among other reasons because bead-like ink droplets cannot be stably transported by a fast moving intermediate transfer member and because they result in a thicker film with less coverage of the surface of the substrate. The presently claimed invention sets out to preserve, or freeze, the thin pancake shape of each ink droplet, that is caused by the flattening of the ink droplet on impacting the surface of the intermediate transfer member, despite the hydrophobicity of the surface of the intermediate transfer member, while also facilitating transfer of the ink droplet so frozen to a substrate.

Although so-called "wetting agents", viz, agents that reduce the surface tension of ink droplets on a particular surface, are known in the art for use with other types of transfer members or for use with non-aqueous inks on hydrophobic surfaces, these are often unsatisfactory in the contexts in which they are used and unsatisfactory for use with the combination of aqueous inks on hydrophobic transfer member surfaces. Inter alia, the use of wetting agents can result in droplets on the surface of the transfer member that undesirably spread or have rough edges, which results in a printed substrate of less than ideal quality.

The present invention facilitates printing using an aqueous ink and an intermediate transfer member having a hydrophobic surface, by applying to the surface of the transfer member to which the ink is applied—i.e. by applying to the hydrophobic release layer—a small amount, preferably in the form of a thin layer, of chemical agent that reduces the tendency of the aqueous inkjet ink droplet that has been printed onto the release layer to contract. Measurements show that the contact angle of water on a hydrophobic release layer so treated remains high, indicating that, in contrast to wetting agents, treatment with the chemical agent does not result in a loss of surface tension. Therefore, the chemical agent of the present disclosure advantageously reduces droplet contraction, without causing an undesired spreading of the droplet much beyond its initial impact pancake shape. Electron micrographs of aqueous inkjet inks printed onto a release layer so treated, then dried while still on the release layer and then transferred to a paper substrate show that the edges of such ink droplets are sharper than the edges of ink droplets transferred to paper by other means. The chemical agent thus fixes the ink film to the release layer, although it will be appreciated that such fixation is weaker than the subsequent adhesion of the resin in the ink film residue to the substrate.

Application of the chemical agent in accordance with some embodiments of the invention results in positive charge on at least portions of the release layer. This may be achieved, for example, by applying to the surface of the intermediate transfer member molecules having one or more Bronsted base functional groups and in particular nitrogen-containing molecules, under conditions in which the molecules bear positive charge. Suitable positively charged or chargeable groups include primary amines, secondary amines, tertiary amines, and quaternary ammonium moieties, and the chemical agent may contain more than one such group. Such groups can be covalently bound to polymeric backbones or constitute part of such backbones, as is the case in, for example, polyethylene imine (both linear and branched, the latter of which may contain all three types of amines), poly(diallyldimethylammonium chloride), poly(4-vinylpyridine), polyallylamine, vinyl pyrrolidone-dimethylaminopropyl methacrylamide co-polymer, vinyl caprolactam-dimethylaminopropyl methacrylamide hydroxyethyl methacrylate copolymer, quaternized copolymer of vinyl pyrrolidone and dimethylaminoethyl methacrylate with diethyl sulfate, guar hydroxypropyltrimonium chloride, and hydroxypropyl guar hydroxypropyltrimonium chloride. Classes of polycations that may be used as chemical agents to be applied to the release layer include, for instance, polyamines, including poly(amino methacrylates) including poly(dialkylaminoalkyl methacrylates) such as poly(dimethylaminoethyl methacrylate) and poly(diethylaminoethyl methacrylate), polyvinylamines, polyvinyl-pyridines including quaternary polyvinylpyridines such as poly(N-ethyl-4-vinylpyridine), poly(vinylbenzyltrimethylamines), polyallylamines such as poly(allylamine hydrochloride) (PAH) and poly(diallyldialklylamines) such as poly(diallyldimethylammonium chloride), polyamidoamines, polyimines including polyalkyleneimines such as polyethyleneimines, polypropyleneimines and ethoxylated polyethyleneimines, and polycationic polysaccharides such as cationic starch and chitosan, as well as copolymers, salts, derivatives and combinations of the preceding, among various others. It will be appreciated that the chemical agent should be chosen to withstand the temperature at which the printing process is carried out (see detailed description of such a process below), at least for a time sufficient to allow jetting and drying of the ink on the dried chemical agent, a period of time which is usually on the order of a few seconds.

Such positively chargeable functional groups of the molecules on the release layer may interact with negatively charged functional groups of molecules of the ink. Suitable negatively charged or negatively chargeable groups include carboxylic acid groups (—COOH), including acrylic acid groups (—CH$_2$=CH—COOH) and methacrylic acid groups (—CH$_2$=C(CH$_3$)—COOH), and sulfonic acid groups (—SO$_3$H). Such groups can be covalently bound to polymeric backbones; for example styrene-acrylic copolymer resins have carboxylic acid functional groups which readily lose protons to yield negatively-charged moieties.

The contacting of the surface of the intermediate transfer member with a positively charged conditioning/treatment solution or dispersion can be viewed as applying molecules that are adsorbed to the surface of the intermediate transfer member and present a net positive charge with which some of the negatively charged molecules in the ink may interact. It will be appreciated that the chemical agent should preferably be quickly adsorbed onto the release layer, e.g. by electrostatic attraction between the charged nitrogen atoms and hydroxyl groups present in the release layer as a result of the condensation reaction employed to form the release layer, but that the strength of this attraction should be less than the attraction between the chemical agent and the ink and the attraction between the ink the substrate.

Thus, among the factors to be taken into account in selecting the chemical agent for use in treating the release layer, charge density and molecular weight have been found to be two important parameters. In cases in which the positive charge is provided by protonation of nitrogen atoms (or by the presence of quaternary ammonium ions), the percentage of nitrogen atoms in the polymer as a function of the weight of the polymer may serve as a proxy for charge density. Thus, for example, it has been found that guar hydroxylpropyltrimonium chloride having a high molecular weight but relatively small percentage of nitrogen atoms (1.4 wt. %), and thus a relatively low charge density, nevertheless functions as an effective chemical agent at a printing temperature of 150° C. On the other hand, polyethylene imines, which have a much higher percentage of nitrogen (around 32% in linear form), were found to be effective with an average molecular weight of as low as 800 in one case, as well as with higher average molecular weights. Thus while the charge densities of PEI polymers are generally in the range of 16-20 meq/g of material, in one case a PEI having a charge density of 8 meq/g was found to be suitable. Other suitable polymers include poly(diallyldimethylammonium chloride)

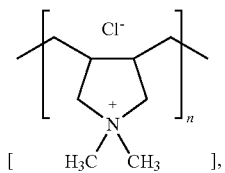

polyallylamine

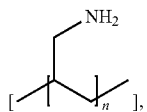

and poly(4-vinylpyridine)

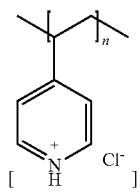

persons skilled in the art will appreciate other suitable polymers. However, as noted above, charge density alone is not determinative: as reported below, a large number of charged species, but of smaller size than the polymers tested, were also tested and found to be far less effective than the polymers. Thus, in some embodiments, the chemical agent has an average molecular weight of at least 2,000, at least 10,000, and preferably at least 25,000. Of the small molecules tested, the one which yielded the best results was pentahydroxy(tetradecanoato)di-chromium. The chemical agent should also be water dispersible, preferably water soluble, and should be able to quickly (i.e. in under a second from application to the release layer, e.g. in 0.5, 0.1, 0.05, 0.01, 0.005 or 0.001 seconds or less, and preferably instantaneously) affix itself to the release layer.

As noted above, the hydrophobic release layer of the intermediate transfer member may be silicon-based, e.g. the product of cross-linking by condensation a silanol-terminated polydialkylsiloxane, such as a polymer of formula (I):

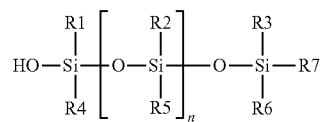

where R1 to R6 are each independently a $C_1$ to $C_6$ hydrocarbon group (saturated or unsaturated, linear or branched), R7 is selected from the group consisting of OH, H or a $C_1$ to $C_6$ hydrocarbon group (saturated or unsaturated, linear and/or branched); and, n is an integer from 50 to 400. In some cases, n is an integer between 200 and 350. In some instances, the silicone has a molecular weight of between 15,000 to 26,000 g/mole, e.g. 16,000 to 23,000 g/mol, prior to crosslinking. In one example of such a material, the silicone is a silanol-terminated polydimethylsiloxane, i.e. R1 to R6 are all $CH_3$ and R7=OH. The crosslinker, which may be present in an amount between e.g. 5 to 20 wt. %, such as 9 to 12 wt. %, relative to the polymer prior to crosslinking, may be a oligomeric condensate of a polyethylsilicate monomer, such as Silopren E 0.7 (Momentive), PSI023 (Gelest) and Ethylsilicate 48 (Colcoat). Preferably the silicon polymer is made by condensation curing.

Aqueous inkjet inks suitable for use in conjunction with embodiments of the present invention are described in the co-pending PCT/IB2013/051755, Agent's reference LIP 11/001 PCT. Such inks contain water-soluble or water-dispersible colorants, e.g. dyes or nano pigments, and a water-dispersible or water-soluble polymeric resin. As noted above, such resins, such as styrene-acrylic copolymers, contain moieties such as free carboxyl groups that are negatively chargeable (i.e. they have protons which they will readily give up) and are generally negatively charged under the conditions of use (e.g. at alkaline pH). It has been found that contacting the hydrophilic release layer with a small amount of positively charged polymeric material so that the positively charged material is disposed thereupon (e.g. as a thin layer) suitably reduces the tendency of the aqueous inkjet ink droplet that has been jetted onto the release layer to contract. In this connection, it should be noted that not all positively-charged materials are suitable to this end. For example, low molecular weight quaternary amines were found to provide little improvement in the transfer of the ink to a paper substrate, whereas polymeric compounds containing amines significantly improved such transfer. An example of a suitable ink formulation is described below.

The chemical agent may be applied to the release layer as a dilute, preferably aqueous, solution or dispersion, for example at a concentration of about 1 wt. %, 0.5 wt. %, 0.3 wt. %, 0.2 wt. % or 0.1 wt. % or less of the chemical agent, preferably under conditions in which the chemical agent is positively charged, e.g. amine nitrogen atoms contained therein are in protonated form as the corresponding ammonium ions. The solution or dispersion may be and preferably is heated to evaporate the solvent prior to the ink image formation, whereby the ink droplets are directed onto a substantially dry surface. Furthermore, it is only necessary to apply a sufficient amount of the chemical agent so that, once dry on the release layer, the chemical agent will retard the contraction of aqueous inkjet ink droplets that have been jetted on the release layer, without substantially affecting the release properties of the release layer. The chemical agent so applied and dried may thus form a thin layer, preferably not more than a few nanometers thick. Application of excess solution containing the chemical agent will not only increase the time required for the solution to dry before the ink is printed onto the release layer but, if too much chemical agent is applied, may also reduce the effectiveness of the transfer of the dried ink to the substrate. In some embodiments, the chemical agent on which ink has been printed will transfer with that ink to the substrate, forming a sandwich in which the chemical agent rests on the ink which lies on the substrate. Since the ink itself will typically form a layer having a thickness several orders of magnitude greater than that of the chemical agent (e.g. ~100-400 nm thickness after drying), the presence of a layer of chemical agent a few nanometers thick on ink on the substrate will not appreciably affect the properties of that ink, such as glossiness or optical density. This is another reason why the amount of chemical agent should ideally be kept to a minimum: an unnecessarily large amount of the chemical agent present on the release layer may result in excess chemical agent on the ink that is transferred to the substrate. Moreover, since even under ideal circumstances some of the chemical agent may remain on the release layer, the avoidance of use of excess chemical agent will minimize the build-up of such agent on the release layer, and will lengthen the time required between cleanings of the release layer.

Solutions or dispersion containing the chemical agent may applied to the release layer in a manner known in the art for applying liquids to solid surfaces, such as by spraying or by use of a roller; it is preferable that the chemical agent be applied evenly to the release layer or evened out after application and before jetting of the ink, preferably before drying of the chemical agent. It will be appreciated that a rod, such as a wire-wound metering rod (Mayer rod), may be employed in the application process. Methods known in the art for regulating the thickness of such a liquid layer may be utilized, and additional machinery may be employed to this end. In some embodiments, the chemical agent is applied to the release layer by undulations from a fountain or spraying and then evened using a metering roller or removed from the transfer member shortly following its exposure thereto (e.g. by wiping or using an air flow). In some embodiments, the metering roller is a chrome roller, i.e. it is made of chrome or is chrome-plated. In one embodiment, the chrome roller is a forward roller that works in conjunction with a metering roller that may be made, for example, from polyurethane. The chrome roller may be equipped with an internal cooling system in order to keep its temperature lower than that of the release layer. As mentioned below, it has been found that placing a drop of 0.3 wt. % PEI solution on a release layer and immediately applying a stream of air to both spread and dry the solution within a few seconds, followed by jetting of an ink onto the release layer and pressing a substrate against the release yielded good transfer of the ink to the substrate in the areas of the release layer which were contacted with PEI. Thus in some embodiments it is sufficient that after removal of the solvent, the chemical agent be present in a layer of a few molecules' thickness or even a monolayer.

Although in principle the aqueous inkjet ink may be jetted onto the chemical agent-coated release layer while the chemical agent is still wet in solution, in practice the chemical agent will generally be dry prior to the jetting of the ink, as the release layer will generally be heated, resulting in drying of the chemical agent solution before jetting of the ink occurs, so that the ink droplets are directed onto a substantially dry surface.

The ratio of charges in the ink droplet to the charges in the region of the chemical agent upon which the ink droplet rests may be small, but this need not be the case. Assuming an initial layer of chemical agent-containing solution of 1 micron thickness containing 0.2 wt. % of the chemical agent, 1 square meter of release layer contains 1 g of chemical agent solution or, after drying, 2 mg of dry chemical agent. Assuming a single ink drop of 12 picoliter volume then has a 30 micron radius containing 7.5 wt. % charged resin, then the area covered by this drop will be approximately $2.83 \times 10^{-9}$ square meters, so that one drop of ink covers 5.65 picograms of the chemical agent. If the chemical agent has a charge density of 6 milliequivalents per gram, then one drop of ink covers $3.39 \times 10^{-14}$ amines of the chemical agent. Since one drop has a mass of 12 ng and contains 7.5 wt % of resin, it contains 0.9 nanograms of resin. If the resin has acid number 86 mg KOH/g then its charge density is 1.54 meq/g, thus it contains 1.38 picoequivalents of carboxyl groups, giving a carboxyl/amine ratio of approximately 40. Using this same calculation, if one assumes an ink drop of the same volume and resin concentration but having a charge density of 12 meq/g, i.e. twice the charge density, then the carboxyl/amine ratio would be 80. Similar calculations can be made for different charge densities of the chemical agent, e.g. if the charge density of the chemical agent is 18, and the other parameters are assumed to be the same.

The calculations in the previous paragraph indicate that any interaction between negative charges in the resin in the ink and positive charges in the chemical agent on the release layer cannot be stoichiometric. It has been found experimentally that if a single droplet of a dilute polyethylene imine (PEI) solution is dropped onto the hydrophobic surface (silanol-terminated dimethylpolysiloxane) and immediately blown away and evaporated by a stream of high pressure air, ink droplets will only thereafter adhere without beading up on the parts of the surface that have come into contact with the dilute PEI solution, even though contact between the PEI solution and the hydrophobic surface was only for a brief instant. As such application can only leave a layer having a thickness of a very few molecules (possibly only a monolayer), this result confirms that the interaction with ink cannot be a stoichiometric chemical one, having regard to the significant difference between the mass of the PEI layer and the mass of the ink droplets.

As the amount of charge on the transfer member is too small to attract more than a small number of charged resin particles in the ink, it is believed that the concentration and distribution of the charged resin particles in the drop is not substantially changed as a result of contact with the chemical agent on the release layer.

Chemical agents in accordance with embodiments of the present invention may also be characterized by their effect on the contact angle of water. In particular, it has been found that when the hydrophobic release layer is coated with a thin layer (~1-2 nm) of chemical agent (e.g. polyethylene imine) in accordance with embodiments of the invention, the contact angle of a drop of distilled water on the hydrophobic release layer does not change in comparison to a drop of water on an uncoated layer. This indicates that the surface energy, and thus the surface tension of the water droplet, is essentially unaffected by the chemical agent. This is in contrast to the action of conventional wetting agents as used in prior art processes, which by definition affect the surface energy of the transfer surface and give rise to droplets having significantly lower contact angles. It will also be appreciated that the effect of some conventional wetting agents on the hydrophobic release layer were tested with aqueous ink and found to yield transfer to a paper substrate that was no better than if the release layer had been untreated.

It has been found, surprisingly, that the application of a chemical agent to a hydrophobic release layer in accordance with embodiments of the invention has a profound effect on the shape of the ink droplets after the droplets stabilize. To revert from a pancake or disk-like shape to a spherical globule, surface tension needs to peel the surface of the ink droplet away from the surface of the intermediate transfer member. However, within the time frame of the printing process described herein—i.e. several seconds from the jetting of the ink onto the intermediate transfer member until the solvent is evaporated from the ink and the ink is then transferred to the substrate—the ink droplet does not revert from a pancake back to a globule on release layers coated with the chemical agent. Without wishing to be bound by theory it is believed that the intermolecular forces between the chemical agent on the release layer and the resin in the ink resist such separation of the surface of the droplet from the surface of the release layer, resulting in a relatively flat droplet of ink which remains flatter to a significantly greater extent than a droplet of the same volume deposited on the same surface without such conditioning. Furthermore, since in areas that are not reached by the droplet the effective hydrophobic nature of the transfer member is maintained, there is little or no spreading of the droplet above that achieved in the initial impact and the boundaries of the droplet are distinct; in other words there is no wetting by the ink droplets of the surface of the intermediate transfer member, thus resulting in droplets having a regular rounded outline.

In some embodiments of the invention, the intermediate transfer member is a flexible blanket of which the outer surface is the hydrophobic outer surface upon which the ink image is formed. It is however alternatively possible for the intermediate transfer member to be constructed as a drum.

In accordance with a feature of some embodiments of the invention, prior to transferring the residue film onto the substrate, the ink image is heated to a temperature at which the residue film of resin and coloring agent that remains after evaporation of the aqueous carrier is rendered tacky (e.g. by softening of the resin). The temperature of the tacky residue film on the intermediate transfer member may be higher than the temperature of the substrate, whereby the residue film cools during adhesion to the substrate.

By suitable selection of the thermo-rheological characteristics of the residue film the effect of the cooling may be to increase the cohesion of the residue film, whereby its cohesion exceeds its adhesion to the transfer member so that, when brought into contact with the substrate e.g. at an impression station (see below), for which it has greater affinity than for the release layer, substantially all of the residue film is separated from the intermediate transfer member and impressed as a film onto the substrate. In this way, it is possible to ensure that the residue film is impressed on the substrate without significant modification to the area covered by the film nor to its thickness.

Upon transfer of the ink image from the release layer to the substrate, some, often most, and often nearly all of the chemical agent upon which ink has been jetted will transfer with the image to the substrate, resulting in an ink image on the substrate having a thin (generally 1-10 nm thick) layer of the chemical agent thereupon. As will be appreciated by persons skilled in the art, the presence of the chemical agent may be detected through various methods, such as X-ray photoelectron spectroscopy, or by dissolving a portion of the chemical agent and then detecting its present in the solution by HPLC or IR spectroscopy.

The ink used in conjunction with the chemical agent on the release layer preferably utilizes an aqueous carrier, which reduces safety concerns and pollution issues that occur with inks that utilize volatile hydrocarbon carrier. In general, the ink must have the physical properties that are needed to apply very small droplets close together on the transfer member.

Other effects that may contribute to the shape of the droplet remaining in the flattened configuration are quick heating of the droplets to increase their its viscosity; the presence of a polymeric conditioning agent that reduces the hydrophobic effect of the silicone layer; and the presence in the ink of a surfactant that reduces the surface tension of the ink.

In general, ink jet printers require a trade-off between purity of the color, the ability to produce complete coverage of a surface and the density of the ink-jet nozzles. If the droplets (after beading) are small, then, in order to achieve complete coverage, it is necessary to have the droplets close together. However, it is very problematic (and expensive) to have the droplets closer than the distance between pixels. By forming relatively flat droplet films that are held in place in the manner described above, the coverage caused by the droplets can be close to complete.

In some instances, the carrier liquid in the image is evaporated from the image after it is formed on the transfer member. Since the colorant in the droplets is distributed within the droplet, either as a solution (e.g. in the case of a dye) or as a dispersion (e.g. in the case of a pigment), the preferred method for removal of the liquid is by heating the image, either by heating the transfer member or by external heating of the image after it is formed on the transfer member, or by a combination of both. In some instances, the carrier is evaporated by blowing a heated gas (e.g. air) over the surface of the transfer member.

In some instances, different ink colors are applied sequentially to the surface of the intermediate transfer member and a heated gas is blown onto the droplets of each ink color after their deposition but before deposition on the intermediate transfer member of the next ink color. In this way, merging of ink droplets of different colors with one another is reduced.

In some instances, the polymer resin used in the ink is a polymer that enables the ink to form a residue film when it is heated (the term residue film is used herein to refer to the ink droplets after evaporation of the liquid carrier therefrom). Acrylic-styrene co-polymers with an average molecular weight around 60,000, for example, have been found to be suitable. Preferably all of the liquid in the ink is evaporated, however, a small amount of liquid, that does not interfere with the forming of a residue film may be present. The formation of a residue film has a number of advantages.

The first of these is that when the image is transferred to the final substrate all, or nearly all, of the image can be transferred. This allows in some cases for a system without a cleaning station for removing residues from the transfer member. It also allows for the image to be attached to the substrate with a nearly constant thickness of the image covering the substrate. Additionally, it prevents the penetration of the image beneath the surface of the substrate.

In general, when an image is transferred to or formed on a substrate while it is still liquid, the image penetrates into the fibers of the substrate and beneath its surface. This causes uneven color and a reduction in the depth of the color, since some of the coloring agent is blocked by the fibers. In some instances, the residue film is very thin, preferably between 10 nm and 800 nm and more preferably between 50 nm and 500 nm. Such thin films are transferred intact to the substrate and, because they are so thin, replicate the surface of the substrate by closely following its contours. This results in a much smaller difference in the gloss of the substrate between printed and non-printed areas.

When the residue film reaches a transfer station at which it is transferred from the intermediate transfer member to the final substrate, it is pressed against the substrate, having preferably previously been heated to a temperature at which it becomes tacky in order to attach itself to the substrate.

Preferably, the substrate, which is generally not heated, cools the image so that it solidifies and transfers to the substrate without leaving any of residue film on the surface of the intermediate transfer member. For this cooling to be effective, additional constraints are placed on the polymer in the ink.

The fact that the carrier is termed an aqueous carrier is not intended to preclude the presence of certain organic materials in the ink, in particular, certain innocuous water miscible organic material and/or co-solvents, such as ethylene glycol or propylene glycol.

As the outer surface of the intermediate transfer member is hydrophobic, there may be little (<1.5%) or substantially no swelling of the transfer member due to absorption of water from the ink; such swelling is known to distort the surface of transfer members in commercially available products utilizing silicone coated transfer members and hydrocarbon carrier liquids. Consequently, the process described above may achieve a highly smooth release surface, as compared to intermediate transfer member surfaces of the prior art.

As the image transfer surface is hydrophobic, and therefore not water absorbent, substantially all the water in the ink should be evaporated away if wetting of the substrate is to be avoided. It will be appreciated that the inclusion of certain co-solvents, such as ethylene glycol or propylene glycol, which have higher boiling points than water, may reduce the rate at which the solvent evaporates relative to the situation in which water is the only solvent. However, the ink droplets on the transfer member are of sufficiently small thickness relative to their surface area, and are usually heated at a temperature for a time, sufficient to allow for evaporation of substantially all of the solvent prior to transfer to the substrate.

DRAWINGS

Embodiments of invention will now be described further, by way of examples, and with reference to the accompanying drawings showing the operation of a printing system in which the presently claimed invention may be practiced, in which:

FIGS. 4 and 5 are scans of paper onto which ink was transferred from a hydrophobic release layer, illustrating the effects of contacting the release layer with different (or no) chemical agents prior to jetting of the ink onto the release layer.

GENERAL OVERVIEW OF A PRINTING APPARATUS

Figure 1:
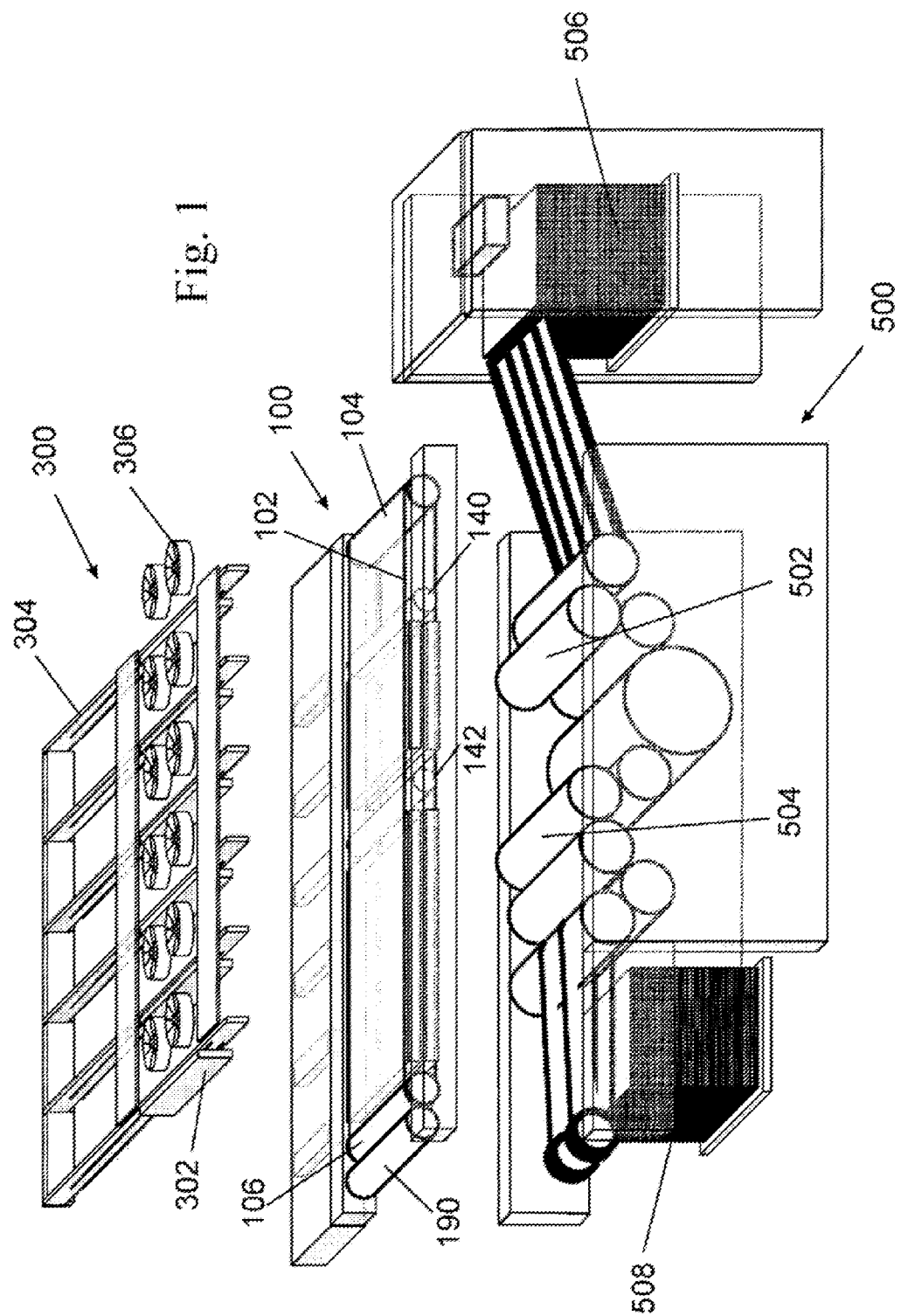
FIG. 1 is an exploded schematic perspective view of a printing system in accordance with which an embodiment of the invention may be used.

The printing system shown in FIGS. 1 and 2 essentially comprises three separate and mutually interacting systems, namely a blanket system 100, an image forming system 300 above the blanket system 100 and a substrate transport system 500 below the blanket system 100.

The blanket system 100 comprises an endless belt or blanket 102 that acts as an intermediate transfer member and is guided over two rollers 104, 106. An image made up of dots of an aqueous ink is applied by image forming system 300 to an upper run of blanket 102 at a location referred herein as the image forming station. A lower run selectively interacts at two impression stations with two impression cylinders 502 and 504 of the substrate transport system 500 to impress an image onto a substrate compressed between the blanket 102 and the respective impression cylinder 502, 504. As will be explained below, the purpose of there being two impression cylinders 502, 504 is to permit duplex printing. In the case of a simplex printer, only one impression station would be needed. The printer shown in FIGS. 1 and 2 can print single sided prints at twice the speed of printing double sided prints. In addition, mixed lots of single and double sided prints can also be printed.

In operation, ink images, each of which is a mirror image of an image to be impressed on a final substrate, are printed by the image forming system 300 onto an upper run of blanket 102. In this context, the term "run" is used to mean a length or segment of the blanket between any two given rollers over which the blanket is guided. While being transported by the blanket 102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 502, 504 the image is impressed onto individual sheets 501 of a substrate which are conveyed by the substrate transport system 500 from an input stack 506 to an output stack 508 via the impression cylinders 502, 504. Though not shown in the figures, the substrate may be a continuous web, in which case the input and output stacks are replaced by a supply roller and a delivery roller. The substrate transport system needs to be adapted accordingly, for instance by using guide rollers and dancers taking slacks of web to properly align it with the impression station.

Image Forming System

The image forming system 300 comprises print bars 302 which may each be slidably mounted on a frame positioned at a fixed height above the surface of the blanket 102. Each print bar 302 may comprise a strip of print heads as wide as the printing area on the blanket 102 and comprises individually controllable print nozzles. The image forming system can have any number of bars 302, each of which may contain an aqueous ink of a different color.

As some print bars may not be required during a particular printing job, the heads can be moved between an operative position (at which the bar remains stationary), in which they overlie blanket 102 and an inoperative position (at which the bar can be accessed for maintenance).

Within each print bar, the ink may be constantly recirculated, filtered, degased and maintained at a desired temperature and pressure, as known to the person skilled in the art without the need for more detailed description.

As different print bars 302 are spaced from one another along the length of the blanket, it is of course essential for their operation to be correctly synchronized with the movement of blanket 102.

If desired, it is possible to provide a blower following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction and preventing their movement on the intermediate transfer member, and also in preventing them from merging into droplets deposited subsequently by other print bars 302.

Blanket and Blanket Support System

The blanket 102, in one variation, is seamed. In particular, the blanket is formed of an initially flat strip of which the ends are fastened to one another, releasably or permanently, to form a continuous loop often referred to as a belt. A releasable fastening may be a zip fastener or a hook and loop fastener that lies substantially parallel to the axes of rollers 104 and 106 over which the blanket is guided. A permanent fastening may be achieved by the use of an adhesive or a tape. Alternatively, the belt may be seamless.

In order to avoid a sudden change in the tension of the blanket as the seam passes over rollers or other parts of the support system, it is desirable to make the seam, as nearly as possible, of the same thickness as the remainder of the blanket.

The primary purpose of the blanket is to receive an ink image from the image forming system and to transfer that image dried but undisturbed to the impression stations. To allow easy transfer of the ink image at each impression station, the blanket has a thin upper release layer that is hydrophobic, suitable examples of which have been described above. The outer surface of the transfer member upon which the ink can be applied may comprise a silicone material. Under suitable conditions, a silanol-, sylyl- or silane-modified or terminated polydialkylsiloxane material has been found to work well.

The strength of the blanket can be derived from a support or reinforcement layer. In one instance, the reinforcement layer is formed of a fabric. If the fabric is woven, the warp and weft threads of the fabric may have a different composition or physical structure so that the blanket should have, for reasons to be discussed below, greater elasticity in its widthways direction (parallel to the axes of the rollers 104 and 106) than in its lengthways direction.

The blanket may comprise additional layers between the reinforcement layer and the release layer, for example to provide conformability and compressibility of the release layer to the surface of the substrate. Other layers provided on the blanket may act as a thermal reservoir or a thermal partial barrier and/or to allow an electrostatic charge to the applied to the release layer. An inner layer may further be provided to control the frictional drag on the blanket as it is rotated over its support structure. Other layers may be included to adhere or connect the afore-mentioned layers one with another or to prevent migration of molecules therebetween.

The blanket support system may comprise thermally conductive support plates 130 forming a continuous flat support surface both on the top side and bottom side of the support frame. Electrical heating elements can be inserted into transverse holes of the plates to apply heat to the plates 130 and through plates 130 to the blanket 102. Other means for heating the blanket will occur to the person of skill in the art and may include heating from below, above, or within the blanket itself.

Also mounted on the blanket support frame are two pressure or nip rollers 140, 142 which can be raised and lowered from the lower run of the blanket. The pressure rollers are located on the underside of the support frame in gaps between the support plates 130 covering the underside of the frame. The pressure rollers 140, 142 are aligned respectively with the impression cylinders 502, 504 of the substrate transport system. Each impression roller and corresponding pressure roller, when both are engaged with the blanket passing therebetween, form an impression station.

In some instances, the blanket support system further comprises a continuous track, which can engage formations on the side edges of the blanket to maintain the blanket taut in its width ways direction. The formations may be spaced projections, such as the teeth of one half of a zip fastener sewn or otherwise attached to the side edge of the blanket. Alternatively, the formations may be a continuous flexible bead of greater thickness than the blanket. The lateral track guide channel may have any cross-section suitable to receive and retain the blanket lateral formations and maintain it taut. To reduce friction, the guide channel may have rolling bearing elements to retain the projections or the beads within the channel.

In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. For this purpose, the blanket can be marked at or near its edge with one or more markings spaced in the direction of motion of the blanket. One or more sensors 107 sense the timing of these markings as they pass the sensor. The speed of the blanket and the speed of the surface of the impression rollers should be the same, for proper transfer of the images to the substrate from the transfer blanket. Signals from the sensor(s) 107 are sent to a controller 109 which also receives an indication of the speed of rotation and angular position of the impression rollers, for example from encoders on the axis of one or both of the impression rollers (not shown). Sensor 107, or another sensor (not shown) also determines the time at which the seam of the blanket passes the sensor. For maximum utility of the usable length of the blanket, it is desirable that the images on the blanket start as close to the seam as feasible.

Figure 2:
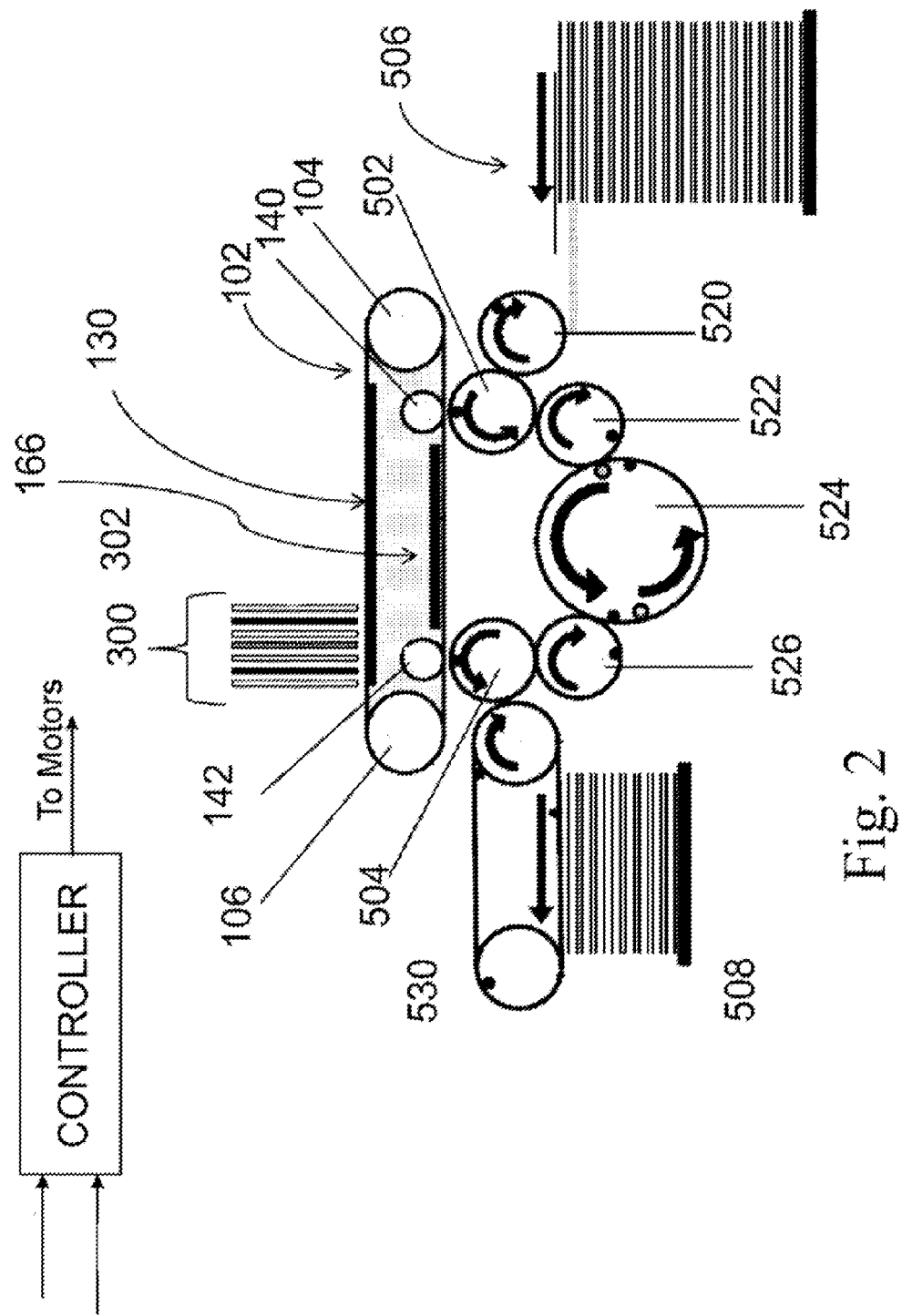
FIG. 2 is a schematic vertical section through the printing system of FIG. 1, in which the various components of the printing system are not drawn to scale.
Figure 3:
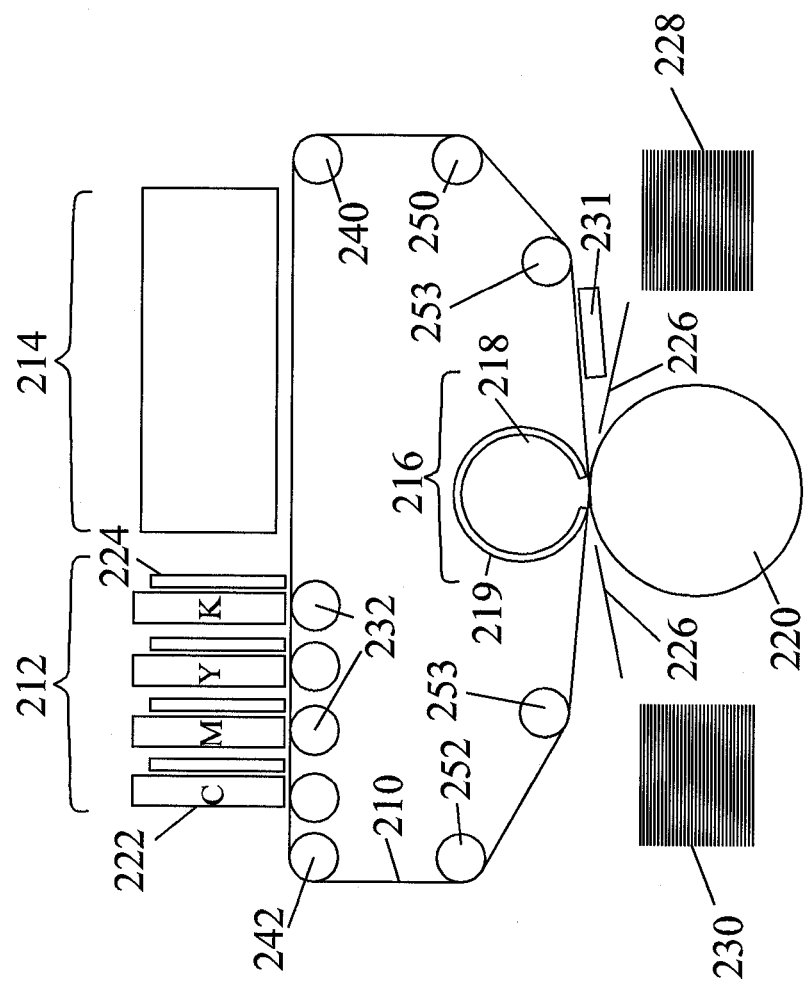
FIG. 3 is a schematic representation of a printing system of the invention in accordance with which an embodiment of the invention may be used.

A printing system operating on the same principle as that of FIG. 1 but adopting an alternative architecture is shown in FIG. 3. The printing system of FIG. 3 comprises an endless belt 210 that cycles through an image forming station 212, a drying station 214, and a transfer station 216. The image forming station 212 being similar to the previously described image forming system 300, illustrated in FIG. 1.

In the image forming station 212 four separate print bars 222 incorporating one or more print heads, that use inkjet technology, deposit aqueous ink droplets of different colors onto the surface of the belt 210. Though the illustrated embodiment has four print bars each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of grey including black) or for two print bars or more to deposit the same color (e.g. black). Following each print bar 222 in the image forming station, an intermediate drying system 224 is provided to blow hot gas (usually air) onto the surface of the belt 210 to dry the ink droplets partially. This hot gas flow may also assist in preventing blockage of the inkjet nozzles and additionally prevents the droplets of different color inks on the belt 210 from merging into one another. In the drying station 214, the ink droplets on the belt 210 are exposed to radiation and/or hot gas in order to dry the ink more thoroughly, driving off most, if not all, of the liquid carrier and leaving behind only a layer of resin and coloring agent which is heated to the point of being rendered tacky.

In the transfer station 216, the belt 210 passes between an impression cylinder 220 and a blanket cylinder 218 that carries a compressible blanket 219. The length of the blanket is equal to or greater than the maximum length of a sheet 226 of substrate on which printing is to take place. The impression cylinder 220 has twice the diameter of the blanket cylinder 218 and can support two sheets 226 of substrate at the same time. Sheets 226 of substrate are carried by a suitable transport mechanism (not shown) from a supply stack 228 and passed through the nip between the impression cylinder 220 and the blanket cylinder 218. Within the nip, the surface of the belt 220 carrying the tacky ink image is pressed firmly by the blanket on the blanket cylinder 218 against the substrate so that the ink image is impressed onto the substrate and separated neatly from the surface of the belt. The substrate is then transported to an output stack 230. In some embodiments, a heater 231 may be provided shortly prior to the nip between the two cylinders 218 and 220 of the image transfer station to assist in rendering the ink film tacky, so as to facilitate transfer to the substrate.

It is important for the belt 210 to move with constant speed through the image forming station 212 as any hesitation or vibration will affect the registration of the ink droplets of different colors. To assist in guiding the belt smoothly, friction is reduced by passing the belt over rollers 232 adjacent each print bar 222 instead of sliding the belt over stationary guide plates. The rollers 232 need not be precisely aligned with their respective print bars. They may be located slightly (e.g. few millimeters) downstream of the print head jetting location. The frictional forces maintain the belt taut and substantially parallel to print bars. The underside of the belt may therefore have high frictional properties as it is only ever in rolling contact with all the surfaces on which it is guided. The lateral tension applied by the guide channels need only be sufficient to maintain the belt 210 flat and in contact with rollers 232 as it passes beneath the print bars 222. Aside from the inextensible reinforcement/support layer, the hydrophobic release surface layer and high friction underside, the belt 210 is not required to serve any other function. It may therefore be a thin light inexpensive belt that is easy to remove and replace, should it become worn.

To achieve intimate contact between the hydrophobic release layer and the substrate, the belt 210 passes through the transfer station 216 which comprises the impression and blanket cylinders 220 and 218. The replaceable blanket 219 releasably clamped onto the outer surface of the blanket cylinder 218 provides the conformability required to urge the release layer of the belt 210 into contact with the substrate sheets 226. Rollers 253 on each side of the transfer station ensure that the belt is maintained in a desired orientation as it passes through the nip between the cylinders 218 and 220 of the transfer station 216.

The above description of the apparatus illustrated in FIG. 3 is simplified and provided only for the purpose of enabling an understanding of printing systems and processes with which the presently claimed invention may be used. For a successful printing system, the control of the various stations of the printing system is important but need not be considered in detail in the present context.

In order for the ink to separate neatly from the surface of the belt 210 it is necessary for the latter surface to have a hydrophobic release layer. In the arrangement of FIG. 1, this hydrophobic release layer is formed as part of a thick blanket that also includes a compressible conformability layer which is necessary to ensure proper contact between the release layer and the substrate at the impression station. The resulting blanket is a very heavy and costly item that needs to be replaced in the event a failure of any of the many functions that it fulfills. In the arrangement of FIG. 3, the hydrophobic release layer forms part of a separate element from the thick blanket 219 that is needed to press it against the substrate sheets 226. In FIG. 3, the release layer is formed on the flexible thin inextensible belt 210 that is preferably fiber reinforced for increased tensile strength in its lengthwise dimension.

Blanket Pre-Treatment

FIG. 1 shows schematically a roller 190 positioned on the external side of the blanket immediately before roller 106, according to an embodiment of the invention. Such a roller 190 may be used to apply a thin film of pre-treatment solution containing a chemical agent, for example a dilute solution of a positively charged polymer according to the teachings herein disclosed, to the surface of the blanket. Preferably, the solvent is totally removed from the film by the time it reaches the print bars of the image forming system, to leave behind a very thin layer of chemical agent on the surface of the blanket that assists the ink droplets to retain their film-like shape after they have impacted the surface of the blanket.

While a roller can be used to apply an even film, in an alternative embodiment the pre-treatment or conditioning material is sprayed onto the surface of the blanket and optionally spread more evenly, for example by the application of a jet from an air knife. Independently of the method used to apply the conditioning solution, if needed, the location at which such pre-print treatment can be performed may be referred herein as the conditioning station. The alternative printing system illustrated in FIG. 3 may also include a conditioning station.

The purpose of the applied chemical agent is to counteract the effect of the surface tension of the aqueous ink upon contact with the hydrophobic release layer of the blanket, without necessarily reducing said surface tension. Without wishing to be bound by theory, it is believed that such pre-treatment chemical agents, for instance some positively charged polymers, such as polyethylenimine, will adhere (temporarily at least), to the silicone surface of the transfer member to form a positively charged layer. However, the amount of charge that is present in such a layer is believed to be much smaller than the negative charge in the droplet itself. The present inventors have found that a very thin layer of chemical agent, perhaps even a layer of molecular thickness, is adequate. This layer of pre-treatment chemical agent on the transfer member may be applied in very dilute form of the suitable chemical agents. Ultimately this thin layer may be transferred onto the substrate, along with the image being impressed.

When the ink droplet impinges on the transfer member, the momentum in the droplet causes it to spread into a relatively flat volume. In the prior art, this flattening of the droplet is almost immediately counteracted by the combination of surface tension of the droplet and the hydrophobic nature of the surface of the transfer member.

In embodiments of the invention, the shape of the ink droplet is "frozen" such that at least some and preferably a major part of the flattening and horizontal extension of the droplet present on impact is preserved. It should be understood that since the recovery of the droplet shape after impact is very fast, the methods of the prior art would not effect phase change by agglomeration and/or coagulation and/or migration.

Without wishing to be bound by theory, it is believed that, on impact, the positive charges which have been placed on the transfer member attract the negatively charged polymer resin particles of the ink droplet that are immediately adjacent to the surface of the member. It is believed that, as the droplet spreads, this effect takes place along a sufficient area of the interface between the spread droplet and the transfer member to retard or prevent the beading of the droplet, at least on the time scale of the printing process, which is generally on the order of seconds.

As the amount of charge is too small to attract more than a small number of charged resin particles in the ink, it is believed that the concentration and distribution of the charged resin particles in the drop is not substantially changed as a result of contact with the chemical agent on the release layer. Furthermore, since the ink is aqueous, the effects of the positive charge are very local, especially in the very short time span needed for freezing the shape of the droplets.

While the applicants have found that coating the intermediate transfer member with a polymer utilizing a roller is an effective method for freezing the droplets, it is believed that spraying or otherwise chemically transferring positive charge to the intermediate transfer member is also possible.
Ink Inks that are suitable for use in conjunction with the treated are release layer are, for example, aqueous inkjet inks that contain (i) a solvent comprising water and optionally a co-solvent, (ii) a negatively chargeable polymeric resin (the ink may include a small amount of a pH-raising substance to ensure that the polymer is negatively charged), and (iii) at least one colorant. Preferably, water constitutes at least 8 wt. % of the ink; the at least one colorant is dispersed or at least partly dissolved within the solvent and constitutes at least 1 wt. % of the ink; the polymeric resin is dispersed or at least partially dissolved within the solvent and constitutes 6 to 40 wt. % of the ink; the average molecular weight of the polymeric resin is least 8,000; prior to jetting the ink has at least one of (i) a viscosity of 2 to 25 centipoise at at least one temperature in the range of 20-60° C. and (ii) a surface tension of not more than 50 milliNewton/m at at least one temperature in the range of 20-60° C. Preferably, the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity; and/or the weight ratio of the resin to the colorant is at least 1:1. The colorant may contain a pigment, preferably a nanopigment, for example having an average particle size ($D_{50}$) of not more than 120 nm. With respect to the ink, "substantially dried" refers to ink that has no more solvent and other volatile compounds than does a layer of the ink of 1 mm initial thickness after such a layer is dried in an oven for 12 hours at 100° C.

Ink Image Heating

The heaters, either inserted into the support plates 130 or positioned above the blanket as intermediate drying system 224 and drying station 214, are used to heat the blanket to a temperature that is appropriate for the rapid evaporation of the ink carrier and compatible with the composition of the blanket. For blankets comprising for instance silanol-, modified or terminated polydialkylsiloxane silicones in the release layer, heating is typically of the order of 150° C., though this temperature may vary within a range from 700° C. to 180° C., depending on various factors such as the composition of the inks and/or of the conditioning solutions if needed. When using beneath heating of the transfer member, it is desirable for the blanket to have relatively high thermal capacity and low thermal conductivity, so that the temperature of the body of the blanket 102 will not change significantly as it moves between the pre-treatment or conditioning station, the image forming station and the impression station(s). When using top heating of the transfer member, the blanket would preferably include a thermally insulating layer to prevent undue dissipation of the applied heat. To apply heat at different rates to the ink image carried by the transfer surface, independently of the architecture of a particular printing system, additional external heaters or energy sources (not shown) may be used to apply energy locally, for example prior to reaching the impression stations to render the ink residue tacky (see 231 in FIG. 3), prior to the image forming station to dry the conditioning agent if necessary and at the printing station to start evaporating the carrier from the ink droplets as soon as possible after they impact the surface of the blanket.

The external heaters may be, for example, hot gas or air blowers 306 (as represented schematically in FIG. 1) or radiant heaters focusing, for example, infrared radiation onto the surface of the blanket, which may attain temperatures in excess of 175° C., 190° C., 200° C., 210° C., or even 220° C.

The residue film left behind in embodiments of the invention may have an average thickness below 1500 nm, below 1200 nm, below 1000 nm, below 800 nm, below 600 nm, below 500 nm, below 400 nm, or below 300 nm.

As explained above, temperature control is of paramount importance to the printing system if printed images of high quality are to be achieved. This is considerably simplified in the embodiment of FIG. 3 in that the thermal capacity of the belt is much lower than that of the blanket 102 in the embodiments of FIGS. 1 and 2.

It has also been proposed above in relation to the embodiment using a thick blanket 102 to include additional layers affecting the thermal capacity of the blanket in view of the blanket being heated from beneath. The separation of the belt 210 from the blanket 219 in the embodiment of FIG. 3 allows the temperature of the ink droplets to be dried and heated to the softening temperature of the resin using much less energy in the drying section 214. Furthermore, the belt may cool down before it returns to the image forming station which reduces or avoids problems caused by trying to spray ink droplets on a hot surface running very close to the inkjet nozzles. Alternatively and additionally, a cooling station may be added to the printing system to reduce the temperature of the belt to a desired value before the belt enters the image forming station. Cooling may be effected by passing the belt 210 over a roller of which the lower half is immersed in a coolant, which may be water or a cleaning/treatment solution, by spraying a coolant onto the belt of by passing the belt 210 over a coolant fountain.

In some of the arrangements discussed hitherto, the release layer of the belt 210 has hydrophobic properties to ensure that the tacky ink residue image peels away from it cleanly in the transfer station. However, at the image forming station the same hydrophobic properties are undesirable because aqueous ink droplets can move around on a hydrophobic surface and, instead of flattening on impact to form droplets having a diameter that increases with the mass of ink in each droplet, the ink tends to ball up into spherical globules. As discussed, in structures using a hydrophobic release layer, steps therefore need to be taken to encourage the ink droplets, which flatten out into a disc on impact, to retain their flattened shape during the drying and transfer stages.

Printing systems as described herein may be produced by modification to existing lithographic printing presses. The ability to adapt existing equipment, while retaining much of the hardware already present, considerably reduces the investment required to convert from technology in common current use. In particular, in the case of the embodiment of FIG. 1, the modification of a tower would involve replacement of the plate cylinder by a set of print bars and replacement of the blanket cylinder by an image transfer drum having a hydrophobic outer surface or carrying a suitable blanket. In the case of the embodiment of FIG. 3, the plate cylinder would be replaced by a set of print bars and a belt passing between the existing plate and blanket cylinders. The substrate handling system would require little modification, if any. Color printing presses are usually formed of several towers and it is possible to convert all or only some of the towers to digital printing towers. Various configurations are possible offering different advantages. For example each of two consecutive towers may be configured as a multicolor digital printer to allow duplex printing if a perfecting cylinder is disposed between them. Alternatively, multiple print bars of the same color may be provided on one tower to allow an increased speed of the entire press.

The following examples illustrate embodiments of the invention.

Example 1

An inkjet ink formulation was prepared containing:

| Ingredient | Function | wt. % |
| --- | --- | --- |
| PV Fast Blue BG (Clariant) | Pigment | 2.3 |
| Neocryl BT-9 (40% water dispersion) (DSM resins) | Resin binder | 16.5 (6.6 solids) |

| Ingredient | Function | wt. % |
| --- | --- | --- |
| Glycerol (Aldrich) | Water-miscible co-solvent | 3.3 |
| Capstone FS-65 (DuPont) | Non-ionic fluorosurfactant | 0.1 |
| Water | — | Balance to 100% |
| Joncryl HPD 296 (35.5% water solution) (BASF) | Dispersant | 3.2 (solid resin) |
| Diethyleneglycol (Aldrich) | Water-miscible co-solvent | 20 |
| Diethyl amine (Aldrich) | pH raiser | 1 |

Preparation Procedure:

A pigment concentrate, containing pigment (14%), water (79%) and Joncryl® HPD 296 (7%) were mixed and milled using a homemade milling machine. The progress of milling was controlled by particle size measurement (Malvern, Nanosizer). The milling stopped when the particle size ($D_{50}$) reached 70 nm. Then the rest of materials were added to the pigment concentrate. After mixing the ink was filtered through 0.5 micron filter.

The efficacy of various materials in improving the transfer of the cyan ink formulation described above were tested as follows:

A piece of transfer blanket having a silanol-terminated polydimethyl siloxane silicone release layer of approximately 200 mm×300 mm was fixed on a hotplate and heated to 130° C. An aqueous solution containing 0.2 wt. % of tested pretreatment material was applied to the release layer to a thickness of 1 micron to completely cover the silicone release layer. In cases in which the material was supplied as a solution, e.g. 40 wt. % PEI in water, the solution was diluted in accordance with the supplier's stated concentration. This was allowed to dry to leave a thin (~1 nm thick) layer of the material. Then the entire surface was printed with drops of ink of 10 picoliter drop size, using aqueous nano-pigment cyan ink described above and a Fujifilm Dimatix DMP-2800 printer (http://www.fujifilmusa.com/products/industrial_inkjet_printheads/deposition-products/dmp-2800/index.html). This was also allowed to dry and the ink residue image was then transferred to Condat Gloss® 135 gsm paper at 130° C. by wrapping the paper around a cylinder and pressing the cylinder into the release layer as the cylinder was rolled over the release layer. The optical density (O.D.) of the ink on the paper was then measured using an X-rite 528 spectrodensitometer (www.xrite.com/product_overview.aspx?id=14). As a control, this same procedure was used, but without first applying a chemical agent to the release layer. The results are summarized in Table 1. (The difference in results for Lupasol G20 and Lupasol G20 Waterfree may be attributed to the higher concentration of chemical agent in the latter.)

TABLE 1

| Chemical Agent [Brand name] | Charge Density, meq/g | Molecular Weight | O.D. |
| --- | --- | --- | --- |
| Control | | | 0.53 |
| Polyethyleneimine (PEI) [Lupasol ® FG] | 16 | 800 | 0.84 |
| PEI [Lupasol ® G 100] | 17 | 5,000 | 1.1 |
| PEI [Lupasol ® G 20] | 16 | 1,300 | 0.75 |
| PEI [Lupasol ® G 20 Waterfree] | 16 | 1,300 | 0.92 |

TABLE 1-continued

| Chemical Agent [Brand name] | Charge Density, meq/g | Molecular Weight | O.D. |
|---|---|---|---|
| PEI [Lupasol ® G 35] | 16 | 2,000 | 0.94 |
| PEI [Lupasol ® HF] | 17 | 25,000 | 1.24 |
| PEI [Lupasol ® P] | 20 | 750,000 | 1.24 |
| PEI, modified [Lupasol ® PN 50] | | 1,000,000 | 1.21 |
| PEI, modified [Lupasol ® PN 60] | | n/a | 0.68 |
| PEI, modified [Lupasol ® PO 100] | | 2,000 | 1.09 |
| PEI [Lupasol ® PR 8515] | 16 | 2,000 | 0.95 |
| PEI [Lupasol ® PS] | 20 | 750,000 | 1.28 |
| PEI, modified [Lupasol ® SK] | 8 | 2,000,000 | 1.13 |
| PEI [Lupasol ® WF] | 17 | 25,000 | 1.28 |
| Poly(diallyldimethylammonium chloride) | ~6 (calc.) | 200,000-300,000 | 1.2 |
| Poly(4-vinylpyridine) | 7 (calc.) | 60,000-160,000 | |
| Polyallylamine | 17.5 (calc.) | 17,000 | 1.17 |
| Chromium, pentahydroxy (tetradecanoato)di- [Quilon ™ C9] | ~6 (calc.) | ~500 | 0.82 |
| Chromium, tetrachloro-m-hydroxy[m-(octadecanoato-O:O')]di-[Quilon ™ H] | ~6 (calc.) | ~500 | 0.77 |
| chromium complex [Quilon ™ S] | 5.5 (calc.) | 545 | 0.77 |
| chromium(3+) chloride hydroxide tetradecanoate (2:4:1:1) [Quilon ™ M] | 6.1 (calc.) | 490 | 0.76 |
| chromium complex [Quilon ™ L] | ~6 (calc.) | ~500 | 0.75 |
| Hydrogenated tallowalkyl(2-ethylhexyl) dimethyl quaternary ammonium sulphate [ACER11S08] | | | 0.5 |
| Quaternary ammonium compounds [ACER11S07] | | | 0.56 |
| C12-C16 alkylbenzyldimethylammonium chloride [ACER11S15] | | | 0.56 |
| Tallow dimethyl benzyl ammonium chloride [ACER11S16] | | | 0.8 |
| Oleyltrimethylammonium hexanoate [ACER11S17] | | | 0.52 |
| Oleyltrimethylammonium decanoate [ACER11S18] | | | 0.77 |
| Oleyltrimethylammonium oleate [ACER11S19] | | | 0.79 |
| Calcium chloride | 18 (calc.) | 110 | 0.58 |
| Didecyl dimethyl ammonium chloride [Arquad 2-10-80] | 2.8 (calc.) | 362.08 | 0.63 |
| Didecyl dimethyl ammonium chloride [Arquad 2.10-70 HFP] | 2.8 (calc.) | 362.08 | 0.69 |
| N-Benzyl-N,N-dimethyltetradecan-1-aminium chloride [Arquad HTB-75] | 2.7 (calc.) | 368 | 0.52 |
| quaternary ammonium compounds, dicoco alkyldimethyl, chlorides [Arquad 2C-75] | 2.2. (calc.) | 447 | 0.71 |
| 1-Hexadecanaminium, N,N,N-trimethyl-, chloride Arquad 16-50] | 3.1 (calc.) | 320 | 0.64 |
| Coco Alkyltrimethylammonium Chloride [Arquad C-35] | 2.5-3.3 (calc.) | 300-400 | 0.7 |
| dihydrogenated tallow dimethyl ammonium chloride [Arquad HC-pastilles] | 1.7 (calc.) | 587 | 0.61 |
| ditallowdimethylammonium chloride [Arquad 2T-70] | 2-2.5 (calc.) | 400-500 | 0.7 |
| Tallowtrimethylammonium chloride [Arquad T-50-HFP] | n/a | n/a | 0.63 |
| Arquad MLB-80 | | | 0.59 |

Example 2

When, prior to printing, the outer surface of the image transfer member (the release layer) is treated with a chemical agent that is, or contains, PEI, transfer of the printed image to a substrate may result in at least some PEI being transferred as well. The PEI may be detected using X-ray photoelectron spectroscopy (XPS) or by other means that will be known to those of ordinary skill in the art of polymer analysis or chemical analysis of polymers.

Thus, two printed paper substrates were prepared under identical conditions (viz. inkjetting aqueous inkjet ink having nanopigment particles onto a transfer member, drying the ink and transferring to the substrate), except that one was prepared without pretreatment of the transfer member using PEI and the other was prepared using such pretreatment. XPS analysis of the printed images was conducted using a VG Scientific Sigma Probe and monochromatic Al Kα x-rays at 1486.6 eV having a beam size of 400 μm. Survey spectra were recorded with a pass energy of 150 eV. For chemical state identification of nitrogen, high energy resolution measurements of N1s were performed with a pass energy of 50 eV. The core level binding energies of the different peaks were normalized by setting the binding energy for the C1s at 285.0 eV. Deconvolution of the observed peaks revealed that the PEI sample contained a unique peak at about 402 eV, which corresponds to a C—$NH_2^+$—C group.

Thus, in an embodiment of the invention, there is provided a printed ink image having an XPS peak at 402.0±0.2 eV.

Example 3

Figure 4:
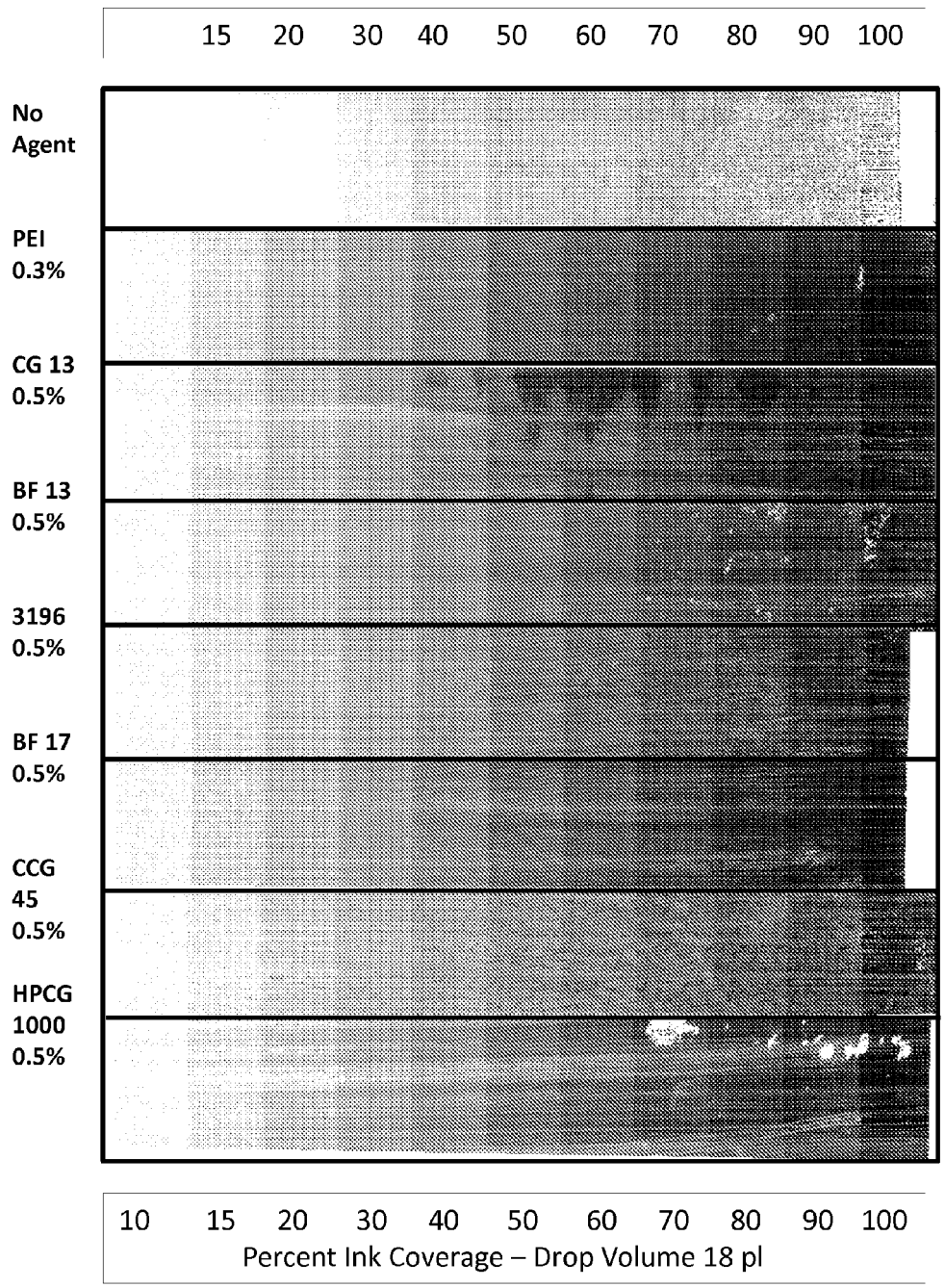

The purpose of the experiment was to check the suitability of candidate chemical agents for the treatment of the release layer. Other than PEI, which was supplied as an aqueous solution (Lupasol® PS, BASF) and diluted 1:100 to a concentration of about 0.3 wt. %, each chemical agent (N-Hance™ BF 17 cationic guar, N-Hance™ CCG 45 cationic guar, N-Hance™ HPCG 1000 cationic guar, N-Hance™ BF 13 cationic guar, N-Hance™ CG 13 cationic guar, N-Hance™ 3196 cationic guar, all from Ashland Specialty Ingredients) was provided as a powder and dissolved in deionized water on a weight per weight basis to prepare a conditioning solution, which was used "as is" without modification of the resulting pH. Each conditioning solution was manually applied to a release layer surface of a blanket of approximately 20 cm×30 cm size, the release layer comprising a silanol-terminated polydimethylsiloxane silicone and being at a temperature of 150° C. The conditioning solution was applied by moistening a Statitech 100% polyester cleanroom wiper with the solution and wiping the release layer surface. The conditioning solution was then allowed to dry spontaneously on the heated blanket. Thereafter, a black ink a black ink (containing Carbon Black Mogul L (Cabot), 1.3 wt. %, Joncryl HPD 296 35.5% water solution (BASF), 35% (12% solids), glycerol 15%, Zonyl FSO-100 (DuPont) 0.2% and balance water) was jetted at a resolution of 600 dpi×600 dpi onto the conditioned release layer while still at 150° C., using conventional Kyocera inkjet print heads. It will be appreciated that during printing the heated release layer was moved relative to the print heads at a rate of 75 cm/s. The test file printed for the experiment printed a gradient of ink coverage, from a less to more dense population of ink dots. The drop size was set to 3 or 4, which corresponds to 13 pl or 18 pl respectively of ink. The ink film formed was allowed to dry for at least 5 seconds and then while still hot was transferred to Condat Gloss® 135 gsm paper using manual pressure, using one of two methods, either by the Paper On Blanket (POB) method, or the Roll method. In POB, the sheet of paper was placed directly onto the inked blanket, then manual pressure was applied. In Roll, the paper was tightly fixed with tape to a metal cylinder and the ink image was transferred to the paper by manually rolling this paper (with pressure) over the inked blanket. Representative printouts obtained by the POB method are shown in FIG. 4, wherein the areas of lower ink coverage are omitted and in some cases the area of 100% coverage is truncated. The diameters of several ink dots in two of the less dense regions of the printed area (not shown in the Figures), having drop size 3 or 4, as reported in the tables below, were then determined using a Lext Confocal Microscope at X20 magnification. The measures were repeated for 5 representative round dots on areas of adequate conditioner coverage and the results in each area were averaged. The diameters of the various dots were compared. Results are presented in the Tables 2 and 3 below; PEI=polyethylene imine, GHPTC=guar hydroxypropyltrimonium chloride, HGHPTC=hydroxyl guar hydroxypropyltrimonium chloride; viscosities and charge densities are as reported by the manufacturer. A larger diameter suggests retention of the spreading of ink on the release layer and good transfer therefrom.

TABLE 2

Results for POB

| Chemical agent, wt. % | Material | Viscosity | Charge density | Ave. diameter, drop size 3 | Ave. diameter, drop size 4 |
|---|---|---|---|---|---|
| None | | | | 41.4276 | 50.5252 |
| Lupasol PS 0.3% | PEI | | Very high | 46.3056 | 56.8316 |
| CG 13 0.1% | GHPTC | High | Medium | 47.8436 | 59.0136 |
| CG 13 0.5% | GHPTC | High | Medium | 49.6364 | 59.0776 |
| BF 13 0.1% | GHPTC | High | Medium | 48.6236 | 56.1832 |
| BF 13 0.5% | GHPTC | High | Medium | 46.1368 | 57.2576 |
| 3196 0.1% | GHPTC | High | Medium | 47.3428 | 61.1776 |
| 3196 0.5% | GHPTC | High | Medium | 48.1552 | 59.5168 |
| BF 17 0.1% | GHPTC | High | Very High | 47.1568 | 59.1356 |
| BF 17 0.5% | GHPTC | High | Very High | 48.4384 | 59.0272 |
| CCG 45 0.1% | GHPTC | Low | Medium | 45.2832 | 56.1232 |
| CCG 45 0.5% | GHPTC | Low | Medium | 44.7548 | 56.3320 |
| Hpcg 1000 0.1% | HGHPTC | Medium | Medium | 45.9252 | 56.8428 |
| Hpcg 1000 0.5% | HGHPTC | Medium | Medium | 45.4280 | 58.3904 |

TABLE 3

Results for Roll

| chemical agent, wt. % | Material | Viscosity | Charge density | Ave. diameter, drop size 3 | Ave. diameter, drop size 4 |
|---|---|---|---|---|---|
| Lupasol PS 0.3% | PEI | | Very high | 43.2656 | 54.7352 |
| CG 13 0.1% | GHPTC | High | Medium | 43.0544 | 54.3544 |
| CG 13 0.5% | GHPTC | High | Medium | 48.2376 | 58.5096 |
| BF 13 0.1% | GHPTC | High | Medium | 47.6172 | 57.9916 |
| BF 13 0.5% | GHPTC | High | Medium | 45.4408 | 57.0412 |
| 3196 0.1% | GHPTC | High | Medium | 49.1352 | 61.2340 |
| 3196 0.5% | GHPTC | High | Medium | 47.5316 | 56.8892 |
| BF 17 0.1% | GHPTC | High | Very High | 46.5030 | 57.5252 |
| BF 17 0.5% | GHPTC | High | Very High | 48.4056 | 58.3452 |
| CCG 45 0.1% | GHPTC | Low | Medium | 44.2352 | 57.1564 |
| CCG 45 0.5% | GHPTC | Low | Medium | 44.8136 | 56.2856 |
| Hpcg 1000 0.1% | HGHPTC | Medium | Medium | 46.6876 | 57.9184 |
| Hpcg 1000 0.5% | HGHPTC | Medium | Medium | 46.1952 | 58.1752 |

The optical densities of these prints, in the region of 100% ink coverage, were also measured, using an X-rite 500 series spectrodensitometer using a 0.5 cm optical probe. The results are presented in Table 4 (numbers are the average of three measurements; the numbers in parenthesis indicate the OD of the tested agent as a % of OD of Lupasol PS):

TABLE 4

| Material | OD - POB | OD - Roll |
|---|---|---|
| None | 0.34 | |
| PEI | 2.00 (100%) | 1.95 (100%) |
| CG 13 0.1% | 1.49 (75%) | 1.44 (74%) |
| CG 13 0.5% | 1.82 (91%) | 1.72 (88%) |

TABLE 4-continued

| Material | OD - POB | OD - Roll |
|---|---|---|
| BF 13 0.1% | 2.06 (103%) | 1.91 (98%) |
| BF 13 0.5% | 1.57 (79%) | 1.78 (91%) |
| 3196 0.1% | 2.06 (103%) | 2.16 (111%) |
| 3196 0.5% | 2.10 (105%) | 2.01 (103%) |
| BF 17 0.1% | 1.72 (86%) | 1.52 (78%) |
| BF 17 0.5% | 2.12 (106%) | 1.69 (87%) |
| CCG 45 0.1% | 1.42 (71%) | 1.42 (73%) |
| CCG 45 0.5% | 1.25 (63%) | 1.59 (82%) |
| Hpcg 1000 0.1% | 2.18 (109%) | 1.86 (95%) |
| Hpcg 1000 0.5% | 1.88 (94%) | 1.72 (88%) |

The above-results show that cationic guars are also suitable chemical agents to serve for the conditioning of release layers of printing blankets in accordance with embodiments of the invention.

Example 4

In a manner similar to Example 3, solutions of various chemical agents were applied to a 10 square cm (cm$^2$) area of a heated blanket having a silanol-terminated polydimethyl-siloxane silicone release layer and dried prior to printing thereon in a gradient pattern with the aqueous ink described in Example 3, this time using a Fujifilm Dimatix DMP-2800 printer jetting 10 pl droplets. Viviprint™ polymers were obtained from International Specialty Products, Wayne, N.J. USA; and a branched PEI having MW 2,000,000 was obtained from Polysciences, Inc., Warrington, Pa.

To account for the variations that may result from differences in printing head efficiency over time, ink was jetted simultaneously onto a surface that was treated with both a PEI solution (1% by volume of Lupasol PS corresponding to about 0.3% weight by weight) as reference and with the chemical agent being tested, each in separate sections or patches of blanket. For a control, the ink was printed on the release layer without prior application of a chemical agent. The ink was then dried and transferred to Condat Gloss® 135 gsm paper using a metal roller and manual pressure. Examples of the resulting images on the paper are shown in FIGS. 5A-5D. The optical densities of these prints in the 100% coverage region were measured. The results are shown in Table 5 below, presented in each case in comparison to the PEI reference print.

TABLE 5

| Chemical agent (solution strength, wt. %) | Chemistry | O.D. | O.D of PEI (1%) ref. | OD Agent/ OD PEI |
|---|---|---|---|---|
| Viviprint 131 (0.1%) | Copolymer of vinyl pyrrolidone dimethylaminopropyl methacrylamide | 0.93 | 1.33 | 70% |
| Viviprint 131 (0.5%) | Copolymer of vinyl pyrrolidone dimethylaminopropyl methacrylamide | 1.07 | 1.28 | 84% |
| Viviprint 200 (0.1%) | Terpolymer of vinyl caprolactam, dimethylaminopropyl methacryamide, hydroxyethyl methacrylate | 0.81 | 1.08 | 75% |
| Viviprint 200 (0.5%) | Terpolymer of vinyl caprolactam dimethylaminopropyl methacryamide hydroxyethyl methacrylate | 0.95 | 1.05 | 90% |
| Viviprint 650 (0.1%) | Quaternized vinyl pyrrolidone/ dimethylaminoethyl methacrylate copolymer in water | 0.96 | 1.25 | 77% |
| Viviprint 650 (0.5%) | Quaternized vinyl pyrrolidone/ dimethylaminoethyl methacrylate copolymer in water | 0.92 | 1.08 | 85% |
| PEI branched (0.1%) | Polyethylenimine | 0.93 | 1.04 | 89% |
| PEI branched (0.5%) | Polyethylenimine | 0.85 | 0.95 | 89% |

The above results show that various amine polymers are suitable for use as chemical agents in accordance with embodiments of the invention.

Example 5

This example is similar to Example 4, but the pH of the solution of the chemical agent being tested was varied by addition of 0.1M HCl or 0.1M NaOH, as appropriate, in order to assess whether or not the pH of the conditioning solution affected the interaction of the chemical agent with the release layer. Except for cationic guar N-Hance™ 3196, the concentration of which is provided in wt. %, the strength of all other conditioning solutions corresponds to the dilution in distilled water of the respective supplied stock solution. Optical density was measured at three points in each of the regions of 50% and 100% ink coverage. The results are presented in Table 6, again as a percentage relative to the PEI reference; the term "ref" in Table 6 indicates that the solution was tested "as is", without any pH adjustment.

TABLE 6

| Chemical Agent | pH | O.D (100%) Dimatix | O.D (50%) Dimatix |
|---|---|---|---|
| PEI (1%) | 9.5 | 1.78 | 0.72 |
| Viviprint 200 (0.1%) | 5.25 | 1.83 | 0.54 |
| Viviprint 200 (1%) | 5 | 1.87 | 0.49 |

TABLE 6-continued

| Chemical Agent | pH | O.D (100%) Dimatix | O.D (50%) Dimatix |
|---|---|---|---|
| Viviprint 200 (0.5%) ref | 5.26 | 1.78 | 0.66 |
| Viviprint 200 (0.5%) | 4.2 | 1.40 | 0.64 |
| Viviprint 200 (0.5%) | 3 | 1.78 | 0.50 |
| Viviprint 200 (0.5%) | 6.5 | 1.54 | 0.69 |
| Viviprint 200(0.5%) | 8.3 | 1.82 | 0.62 |
| Viviprint131 (0.1%) | 5 | 1.48 | 0.51 |
| Viviprint 131 (1%) | 4 | 1.50 | 0.50 |
| Viviprint 650 (0.1%) | 5.2 | 1.51 | 0.61 |
| Viviprint 650 (1%) | 4.8 | 1.62 | 0.65 |
| N-Hance 3196 (0.5%) ref | 9.5 | 1.96 | 0.68 |
| N-Hance 3196 (0.5%) | 11 | 2.02 | 0.74 |
| N-Hance 3196 (0.5%) | 8 | 1.98 | 0.72 |
| N-Hance 3196 (0.5%) | 6.9 | 1.94 | 0.57 |
| N-Hance 3196 (0.5%) | 5.5 | 1.98 | 0.68 |

The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise" "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "an impression station" or "at least one impression station" may include a plurality of impression stations.

What is claimed is:

1. A printing process comprising jetting an aqueous inkjet ink containing a negatively charged polymeric resin and a colorant onto a hydrophobic release layer of an intermediate transfer member, further comprising, prior to said jetting, contacting the hydrophobic release layer with an aqueous solution or dispersion of a polymeric chemical agent having a positive charge density of at least 3 meq/g of polymeric chemical agent and an average molecular weight of at least 1,000, provided that if the positive charge density of the polymeric chemical agent is less than 6 meq/g of polymeric chemical agent then the average molecular weight of the polymeric chemical agent is at least 5,000, wherein the polymeric chemical a ent is selected from the group consisting of linear polyethylene imine, branched polyethylene imine, modified polyethylene imine, poly(diallyldimethyl-ammonium chloride), poly(4-vinylpyridine), polyallylamine, a vinyl pyrrolidone-dimethylaminopropyl methacrylamide co-polymer, a vinyl caprolactam-dimethylaminopropyl methacrylamide hydroxyethyl methacrylate terpolymer, a quaternized copolymer of vinyl pyrrolidone and dimethyl-aminoethyl methacrylate with diethyl sulfate, a guar hydroxypropyltrimonium chloride, a hydroxypropyl guar hydroxypropyltrimonium chloride, and combinations thereof, and further comprising, after said jetting, transferring the ink to a substrate.

2. The method of claim 1, further comprising removing the aqueous solvent of the polymeric chemical agent prior to said jetting.

3. The method of claim 2, wherein said jetting comprises jetting an ink drop to form a ink film on the polymeric chemical agent on the hydrophobic release layer, wherein the ratio of charges in the ink film to the charges in the polymeric chemical agent in the region covered by said ink film is at least 2:1.

4. The method of claim 3, wherein the aqueous inkjet ink comprises a solvent containing water and, optionally, a co-solvent, the water constituting at least 8 wt. % of the ink;
said colorant being dispersed or at least partly dissolved within said solvent, the colorant constituting at least 1 wt. % of the ink;
said negatively charged polymeric resin is dispersed or at least partially dissolved within the solvent, the organic polymeric resin constituting 6 to 40 wt. % of the ink, wherein the average molecular weight of the organic polymeric resin is at least 8,000,
the ink having (i) a viscosity of 2 to 25 centipoise at at least one temperature in the range of 20-60° C. (ii) a surface tension of not more than 50 milliNewton/m at at least one temperature in the range of 20-60° C. or (iii) both a viscosity of 2 to 25 centipoise at at least one temperature in the range of 20-60° C. and a surface tension of not more than 50 milliNewton/m at at least one temperature in the range of 20-60° C.;
and wherein:
(1) the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity;
(2) the weight ratio of the resin to the colorant is at least 1:1; or
(3) (i) the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity; and (ii) the weight ratio of the resin to the colorant is at least 1:1.

5. The method of claim 2, wherein the aqueous inkjet ink comprises a solvent containing water, the method further comprising, after said jetting, removing the solvent from the jetted aqueous inkjet ink; and transferring the image to a substrate.

6. The method of claim 5, wherein (a) the solvent of the aqueous inkjet ink may optionally comprise, in addition to water, a co-solvent, the water constituting at least 8 wt. % of the ink; (b) the colorant is dispersed or at least partly dissolved within said solvent, the colorant constituting at least 1 wt. % of the ink; and (c) the negatively charged polymeric resin is dispersed or at least partially dissolved within the solvent, the organic polymeric resin constituting 6 to 40 wt. % of the ink, wherein the average molecular weight of the organic polymeric resin is at least 8,000,
the ink having (i) a viscosity of 2 to 25 centipoise at at least one temperature in the range of 20-60° C., (ii) a surface tension of not more than 50 milliNewton/m at at least one temperature in the range of 20-60° C., or (iii) both a viscosity of 2 to 25 centipoise at at least one temperature in the range of 20-60° C. and a surface tension of not more than 50 milliNewton/m at at least one temperature in the range of 20-60° C.;
and wherein:
(1) the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity;
(2) the weight ratio of the resin to the colorant is at least 1:1; or
(3) (i) the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity and (ii) the weight ratio of the resin to the colorant is at least 1:1.

7. The method of claim 5, wherein the hydrophobic release layer comprises a cross-linked silanol- or silane-modified or -terminated polydialkylsiloxane.

8. The method of claim 1, wherein the aqueous inkjet ink comprises a solvent containing water and optionally a co-solvent, the water constituting at least 8 wt. % of the ink; the colorant is dispersed or at least partly dissolved within said solvent and constitutes at least 1 wt. % of the ink; the polymeric resin is dispersed or at least partially dissolved within the solvent and constitutes 6 to 40 wt. % of the ink; the average molecular weight of the polymeric resin is at least 8,000; prior to jetting the ink has (i) a viscosity of 2 to 25 centipoise at at least one temperature in the range of 20-60° C., (ii) a surface tension of not more than 50 milliNewton/m at at least one temperature in the range of 20-60° C., or (iii) a viscosity of 2 to 25 centipoise at at least one temperature in the range of 20-60° C. and a surface tension of not more than 50 milliNewton/m at at least one temperature in the range of 20-60° C.; and wherein:
(1) the ink is such that, when substantially dried, (a) at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity;
(2) the weight ratio of the resin to the colorant is at least 1:1; or
(3) (i) the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity and (ii) the weight ratio of the resin to the colorant is at least 1:1.

9. The method of claim 1, wherein: (a) the charge density of the polymeric chemical agent is at least 6 meq/g of polymeric chemical agent; (b) the polymeric chemical agent has an average molecular weight of at least 2,000; or (c) the charge density of the polymeric chemical agent is at least 6 meq/g of polymeric chemical agent and the chemical agent has an average molecular weight of at least 2,000.

10. The method of claim 1, wherein the polymeric chemical agent comprises one or more positively chargeable nitrogen atoms which constitute at least 1.4% by weight of the polymeric chemical agent.

11. The method of claim 1, wherein the polymeric chemical agent is a solid at room temperature.

12. The method of claim 1, wherein the polymeric chemical agent is stable at a temperature of up to at least 100° C.

13. The method of claim 1, wherein: (a) the concentration of the polymeric chemical agent in the solution or dispersion prior to application to the hydrophobic release layer is not more than 5 wt %; (b) the thickness of the solution of polymeric chemical agent following contact with the hydrophobic release layer but before removal of the solvent therefrom is less than 1000 microns; (c) the temperature of the hydrophobic release layer when contacted with the aqueous solution or dispersion of the polymeric chemical agent is at least 100° C.; (d) the thickness of the polymeric chemical agent on the hydrophobic release layer after removal of the solvent is not more than 1000 nm; or (e) the concentration of the polymeric chemical agent on the hydrophobic release layer after removal of the solvent is not more than 50 mg per square meter; wherein more than one of the preceding statements (a)-(e) may be true.

14. The method of claim 1, wherein the hydrophobic release layer comprises a cross-linked silanol- or silane-modified or -terminated polydialkylsiloxane.

15. The method of claim 14, wherein the hydrophobic release layer comprises a condensation cured silanol-terminated polydialkylsiloxane silicone having the formula:

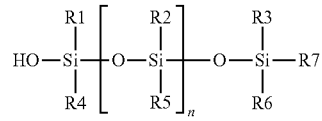

where R1 to R6 are each independently a saturated or unsaturated, linear, branched or cyclic $C_1$ to $C_6$ hydrocarbon group; R7 is selected from the group consisting of OH, H or a saturated or unsaturated, linear, branched or cyclic $C_1$ to $C_6$ hydrocarbon group; and n is an integer from 50 to 400.

16. The method of claim 1, wherein the aqueous inkjet ink which has been jetted onto said hydrophobic release layer forms an image, and the method further comprises, after said jetting, removing substantially all the water from the aqueous inkjet ink and said transferring said ink to said substrate comprises transferring the image to said substrate, wherein, when the substrate is coated digital printing 135 gsm paper, the optical density of the transferred image on the substrate at least 50% greater than the optical density of the same image when printed under identical conditions but without application of the polymeric chemical agent to the hydrophobic release layer.

17. A method, comprising providing an intermediate transfer member having a hydrophobic release layer; contacting the hydrophobic release layer with an aqueous solution or dispersion of a polymeric chemical agent having a positive charge density of at least 3 meq/g of polymeric chemical agent and an average molecular weight of at least 1,000, provided that if the positive charge density of the polymeric chemical agent is less than 6 meq/g of polymeric chemical agent then the average molecular weight of the polymeric chemical agent is at least 5,000; removing the solvent from the aqueous solution or dispersion on said hydrophobic release layer, whereby to obtain a hydrophobic release layer having polymeric chemical agent thereupon; jetting onto the hydrophobic release layer having the polymeric chemical agent thereupon an aqueous inkjet ink so as to form an aqueous inkjet ink image, wherein the aqueous inkjet ink contains (i) a solvent comprising water and optionally a co-solvent, (ii) a negatively charged polymeric resin, and (iii) at least one colorant; removing the water and optional co-solvent from the aqueous inkjet ink image; and transferring the image to a substrate: wherein the polymeric chemical agent is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer, a vinyl caprolactam-dimethylaminopropyl vinyl pyrrolidone and dimethylaminoethyl methacrylate with diethyl sulfate, a guar hydroxypropyltrimonium chloride, a hydroxypropyl guar hydroxypropyltrimonium chloride, and combinations thereof.

18. The method of claim 17, wherein water constitutes at least 8 wt. % of the ink; the at least one colorant is dispersed or at least partly dissolved within said solvent and constitutes at least 1 wt. % of the ink; the polymeric resin is dispersed or at least partially dissolved within the solvent and constitutes 6 to 40 wt. % of the ink; the average molecular weight of the polymeric resin is at least 8,000; prior to jetting the ink has (i) a viscosity of 2 to 25 centipoise at at least one temperature in the range of 20-60° C., (ii) a surface tension of not more than 50 milliNewton/m at at least one temperature in the range of 20-60° C., or (iii) both a viscosity of 2 to 25 centipoise at at least one temperature in the range of 20-60° C. and a surface tension of not more than 50 milliNewton/m at at least one temperature in the range of 20-60° C.; and wherein:
(1) the ink is such that, when substantially dried, (a) at at least one temperature in the range of 90° C. to 195° C., the dried ink has a first dynamic viscosity in the range of 1,000,000 ($1\times10^6$) cP to 300,000,000 ($3\times10^8$) cP, and (b) at at least one temperature in the range of 50° C. to 85° C., the dried ink has a second dynamic viscosity of at least 80,000,000 ($8\times10^7$) cP, wherein the second dynamic viscosity exceeds the first dynamic viscosity;
(2) the weight ratio of the resin to the colorant is at least 1:1; or
(3) (i) the ink is such that, when substantially dried, (a) at at least one temperature in the range of 90° C. to 195° C., the dried ink has a first dynamic viscosity in the range of 1,000,000 ($1\times10^6$) cP to 300,000,000 ($3\times10^8$) cP, and (b) at at least one temperature in the range of 50° C. to 85° C., the dried ink has a second dynamic viscosity of at least 80,000,000 ($8\times10^7$) cP, wherein the second dynamic viscosity exceeds the first dynamic viscosity, and (ii) the weight ratio of the resin to the colorant is at least 1:1.

19. A printing method in which an aqueous inkjet ink, including a negatively charged organic polymeric resin and a colorant, is jetted onto a hydrophobic release layer of an intermediate transfer member, wherein before the aqueous inkjet ink is jetted onto said hydrophobic release layer, (a) said hydrophobic release layer is contacted with an aqueous solution or dispersion of a polymeric chemical agent selected from the group consisting of linear polyethylene imine, branched polyethylene imine, and modified polyethylene imine, the polymeric chemical agent being dissolved or dispersed in an aqueous solvent, and (b) said aqueous solvent is then removed from said aqueous solution or dispersion on said hydrophobic release layer; and wherein after said aqueous inkjet ink is jetted onto said hydrophobic release layer, substantially all the water in the aqueous inkjet ink is evaporated therefrom and the ink is then transferred to a substrate; said polymeric chemical agent having a positive charge density of at least 3 meq/g of polymeric chemical agent and an average molecular weight of at least 1,000, provided that if the positive charge density of the polymeric chemical agent is less than 6 meq/g of polymeric chemical agent then the average molecular weight of the polymeric chemical agent is at least 5,000; the amount of polymeric chemical agent being sufficient to measurably reduce the beading of a jetted ink droplet between the time said ink droplet spreads upon impinging upon the intermediate transfer member and the time the water is evaporated therefrom relative to the beading that occurs under identical conditions but in which the hydrophobic release layer has not been contacted with said polymeric chemical agent.

20. The method of claim 19, wherein the hydrophobic release layer comprises a cross-linked silanol- or silane-modified or -terminated polydialkylsiloxane.

* * * * *